United States Patent
Song et al.

(10) Patent No.: US 11,110,948 B2
(45) Date of Patent: *Sep. 7, 2021

(54) FOUR-WHEELED FOLDING HANDCART

(71) Applicants: Jae Ho Song, Yongin-si (KR); Won Seok Song, Yongin-si (KR); Bo Kyoung Song, Suwon-si (KR)

(72) Inventors: Jae Ho Song, Yongin-si (KR); Won Seok Song, Yongin-si (KR); Bo Kyoung Song, Suwon-si (KR)

( * ) Notice: Subject to any disclaimer, the term of this patent is extended or adjusted under 35 U.S.C. 154(b) by 251 days.

This patent is subject to a terminal disclaimer.

(21) Appl. No.: 16/401,463

(22) Filed: May 2, 2019

(65) Prior Publication Data

US 2020/0307664 A1    Oct. 1, 2020

(30) Foreign Application Priority Data

Mar. 29, 2019   (KR) .......................... 10-2019-0036976

(51) Int. Cl.
*B62B 3/02*    (2006.01)
*B62B 3/00*    (2006.01)
*B62B 5/06*    (2006.01)

(52) U.S. Cl.
CPC ................ *B62B 3/02* (2013.01); *B62B 3/008* (2013.01); *B62B 5/066* (2013.01);
(Continued)

(58) Field of Classification Search
CPC ........... B62B 3/02; B62B 3/008; B62B 5/066; B62B 2205/12; B62B 2206/02; B62B 2206/06
See application file for complete search history.

(56) References Cited

U.S. PATENT DOCUMENTS 1,683,029 A * 9/1928 Fanger .................. B62B 5/0083
                                              280/651
2,782,047 A * 2/1957 Moran ..................... B62B 1/12
                                              280/654
(Continued)

FOREIGN PATENT DOCUMENTS

FR      2965781 A1 *  4/2012  ............... B62B 3/02
KR   19990033105 U    8/1999
(Continued)

OTHER PUBLICATIONS

Decision to Grant / Notice of Patent Allowance from priority application in Korea; dated Jul. 17, 2019; indicative of degree of relevance of references above.

*Primary Examiner* — Jacob B Meyer
(74) *Attorney, Agent, or Firm* — Egbert, McDaniel & Swartz, PLLC

(57) ABSTRACT

Disclosed is a four-wheeled folding handcart, including: a main body; and a loading plate provided with at least one loading plate wheel unit at a lower portion thereof, connected to the main body via a hinge unit such that the loading plate is folded by the hinge unit while being rotated toward the main body, and loading an article thereon. The loading plate wheel unit is connected to a wheel rod rotated by the rotation of the hinge unit in a direction perpendicular to a rotational direction of the hinge unit. The loading plate wheel unit is configured such that, when the loading plate is rotated and folded, the loading plate wheel unit is rotated and folded as the wheel rod rotates, and when the loading plate is rotated and unfolded, the loading plate wheel unit is rotated and unfolded as the wheel rod rotates reversely.

11 Claims, 24 Drawing Sheets

(52) U.S. Cl.
CPC ....... *B62B 2205/12* (2013.01); *B62B 2206/02* (2013.01); *B62B 2206/06* (2013.01)

(56) References Cited

U.S. PATENT DOCUMENTS

| | | | | |
|---|---|---|---|---|
| 2,832,606 | A * | 4/1958 | Patterson | B62B 1/12 280/37 |
| 3,092,395 | A * | 6/1963 | Mitty | B62B 1/12 280/652 |
| 3,135,527 | A * | 6/1964 | Knapp | B62B 1/12 280/654 |
| 3,492,016 | A * | 1/1970 | O'Connor | B62B 1/12 280/47.26 |
| 4,448,434 | A * | 5/1984 | Anderson | B62B 1/12 224/915 |
| 4,647,056 | A * | 3/1987 | Baker | A45C 13/385 190/18 A |
| 4,754,985 | A * | 7/1988 | Im | B62B 1/125 280/40 |
| 4,917,392 | A * | 4/1990 | Ambasz | B62B 1/125 280/40 |
| 4,917,401 | A * | 4/1990 | Iwaki | B62B 1/125 280/655 |
| 4,969,660 | A * | 11/1990 | Spak | B62B 1/12 280/47.29 |
| 4,993,727 | A * | 2/1991 | vom Braucke | B62B 1/12 280/40 |
| 5,072,958 | A * | 12/1991 | Young | B62B 1/12 280/40 |
| 5,127,662 | A * | 7/1992 | Spak | B62B 1/125 280/40 |
| 5,213,360 | A * | 5/1993 | Lin | A47D 1/02 280/648 |
| 5,312,006 | A * | 5/1994 | Lag | B62B 1/12 211/195 |
| 5,348,325 | A * | 9/1994 | Abrams | B62B 1/12 280/40 |
| 5,711,438 | A * | 1/1998 | Smith | A47F 5/116 211/149 |
| 5,803,471 | A * | 9/1998 | DeMars | B62B 1/125 280/40 |
| 5,984,327 | A * | 11/1999 | Hsieh | A45C 13/385 280/38 |
| 6,053,514 | A * | 4/2000 | Su | B62B 1/12 280/40 |
| 6,220,611 | B1 * | 4/2001 | Shapiro | B62B 3/007 280/47.34 |
| 6,253,943 | B1 * | 7/2001 | Spykerman | B60R 7/02 220/6 |
| 6,267,393 | B1 * | 7/2001 | Mengrone | A45C 5/14 280/30 |
| 6,386,558 | B1 * | 5/2002 | Chang | B62B 1/125 280/40 |
| 6,425,599 | B1 * | 7/2002 | Tsai | B62B 1/125 280/40 |
| RE38,436 | E * | 2/2004 | Su | B62B 1/12 280/40 |
| 6,685,214 | B2 * | 2/2004 | Gregory | A63C 11/026 280/47.29 |
| 6,955,365 | B2 * | 10/2005 | Giampavolo | B62B 1/12 229/117.09 |
| 7,097,183 | B1 * | 8/2006 | Su | B62B 1/12 280/40 |
| 7,140,635 | B2 * | 11/2006 | Johnson | B62B 1/12 280/646 |
| 7,441,785 | B1 * | 10/2008 | Tsai | B62B 1/12 280/47.29 |
| 7,726,671 | B2 * | 6/2010 | Musi | B65D 31/10 280/47.26 |
| 7,731,221 | B2 * | 6/2010 | Bess | B62B 3/02 280/651 |
| 7,784,816 | B2 * | 8/2010 | Jian | B62B 3/02 280/651 |
| D625,895 | S * | 10/2010 | Musi | D34/24 |
| 7,819,409 | B2 * | 10/2010 | Chang | B62B 5/0083 280/47.371 |
| 8,152,179 | B2 * | 4/2012 | Yang | A61G 5/08 280/39 |
| 8,439,374 | B1 * | 5/2013 | Elden | B62B 1/12 280/47.26 |
| 8,465,029 | B2 * | 6/2013 | Yang | B62B 1/12 280/47.27 |
| 8,602,444 | B2 * | 12/2013 | Chang | B62B 1/12 280/652 |
| 8,925,957 | B2 * | 1/2015 | Grundvig | B62B 3/02 280/651 |
| 8,936,259 | B2 * | 1/2015 | Tsai | B62B 1/042 280/47.29 |
| 9,096,249 | B2 * | 8/2015 | Gibson | B62B 1/12 |
| 9,150,233 | B2 * | 10/2015 | Su | B62B 1/002 |
| 9,187,106 | B2 * | 11/2015 | Khodor | B62B 1/12 |
| 9,199,655 | B1 * | 12/2015 | Su | B62B 1/12 |
| 9,233,700 | B1 * | 1/2016 | Elden | B62B 1/266 |
| 9,327,745 | B2 * | 5/2016 | Tsai | B62B 1/042 |
| 9,403,546 | B1 * | 8/2016 | Su | B62B 5/067 |
| RE46,150 | E * | 9/2016 | Liao | B62B 3/12 |
| 9,499,186 | B1 * | 11/2016 | Kim | B62B 3/02 |
| 9,616,907 | B1 * | 4/2017 | Gibson | B62B 1/12 |
| 9,637,149 | B1 * | 5/2017 | Wang | B62B 1/12 |
| 9,643,628 | B2 * | 5/2017 | Herbault | B62B 5/003 |
| 10,040,466 | B1 * | 8/2018 | Su | B62B 5/064 |
| 10,118,633 | B2 * | 11/2018 | Gibson | B62B 1/12 |
| 10,131,371 | B2 * | 11/2018 | Camarco | B60R 9/06 |
| 10,131,374 | B1 * | 11/2018 | Khodor | B62B 5/065 |
| 10,376,030 | B1 * | 8/2019 | Koh | A45C 13/26 |
| 10,392,041 | B1 * | 8/2019 | Khodor | B62B 1/12 |
| 10,668,938 | B1 * | 6/2020 | Song | B62B 1/12 |
| 10,676,235 | B1 * | 6/2020 | Song | B65D 25/24 |
| 10,780,907 | B1 * | 9/2020 | Camarco | B62B 3/02 |
| 10,850,760 | B2 * | 12/2020 | Shapiro | B62B 3/022 |
| 10,974,751 | B2 * | 4/2021 | Ritucci | B62B 3/02 |
| 10,974,752 | B2 * | 4/2021 | Song | B62B 3/022 |
| 2002/0180184 | A1 * | 12/2002 | Chang | B62B 1/125 280/652 |
| 2003/0011173 | A1 * | 1/2003 | Shall | B62B 1/262 280/651 |
| 2003/0034636 | A1 * | 2/2003 | Ng | A45C 5/14 280/652 |
| 2004/0201186 | A1 * | 10/2004 | Tornabene | B62B 3/108 280/30 |
| 2004/0245733 | A1 * | 12/2004 | Abel | B62B 3/001 280/39 |
| 2005/0006877 | A1 * | 1/2005 | Kachkovsky | B62B 3/027 280/641 |
| 2005/0258621 | A1 * | 11/2005 | Johnson | B62B 1/12 280/651 |
| 2008/0073880 | A1 * | 3/2008 | Bess | B62B 3/02 280/651 |
| 2008/0265547 | A1 * | 10/2008 | Tsai | B62B 1/12 280/646 |
| 2008/0272578 | A1 * | 11/2008 | Tsai | B62B 1/12 280/651 |
| 2010/0117336 | A1 * | 5/2010 | Yang | A61G 5/08 280/639 |
| 2010/0140889 | A1 * | 6/2010 | Chang | B62B 5/0083 280/47.34 |
| 2011/0291390 | A1 * | 12/2011 | Benimeli | A45C 13/262 280/655 |
| 2013/0049333 | A1 * | 2/2013 | Yang | B62B 1/12 280/652 |
| 2013/0147163 | A1 * | 6/2013 | Chang | B62B 1/12 280/652 |
| 2014/0117072 | A1 * | 5/2014 | Cullen | B65D 11/1853 229/117.05 |
| 2014/0151172 | A1 * | 6/2014 | Diaz | A45C 13/22 190/1 |
| 2015/0014965 | A1 * | 1/2015 | Gibson | B62B 1/12 280/651 |
| 2015/0123363 | A1 * | 5/2015 | Tsai | B62B 1/12 280/47.29 |

(56) References Cited

U.S. PATENT DOCUMENTS

| | | | | |
|---|---|---|---|---|
| 2015/0137487 A1* | 5/2015 | Su | ............................. | B62B 3/02 |
| | | | | 280/655 |
| 2015/0203136 A1* | 7/2015 | Wang | ..................... | B62B 1/045 |
| | | | | 280/47.29 |
| 2015/0298714 A1* | 10/2015 | Gibson | ..................... | B62B 1/12 |
| | | | | 280/651 |
| 2016/0075358 A1* | 3/2016 | Simon | ....................... | B62B 1/12 |
| | | | | 280/40 |
| 2016/0207555 A1* | 7/2016 | Gibson | ................... | B62B 1/002 |
| 2017/0001654 A1* | 1/2017 | Obrien | ...................... | B62B 1/14 |
| 2017/0106889 A1* | 4/2017 | Powwarynn | ............ | B62B 1/002 |
| 2020/0165030 A1* | 5/2020 | Song | ......................... | B62B 1/12 |
| 2020/0207393 A1* | 7/2020 | Song | ....................... | B62B 5/067 |
| 2020/0307664 A1* | 10/2020 | Song | ......................... | B62B 3/02 |

FOREIGN PATENT DOCUMENTS

| | | | | |
|---|---|---|---|---|
| KR | 1020010110844 A | 12/2001 | | |
| KR | 1020090109526 A | 9/2009 | | |
| KR | 1020170034710 A | 9/2015 | | |
| KR | 20170105732 A | 9/2017 | | |
| WO | WO-0073122 A1 * | 12/2000 | ............... | B62B 3/02 |
| WO | WO-0200486 A2 * | 1/2002 | ............... | B62B 3/02 |
| WO | WO2021008231 A1 * | 1/2021 | | |

\* cited by examiner

FOUR-WHEELED FOLDING HANDCART

CROSS-REFERENCE TO RELATED APPLICATIONS

Not applicable.

Statement Regarding Federally Sponsored Research or Development

Not applicable.

Names of the Parties to a Joint Research Agreement

Not applicable.

Incorporation-by-Reference of Materials Submitted on a Compact Disc

Not applicable.

BACKGROUND OF THE INVENTION

1. Field of the Invention

The present invention relates to a four-wheeled folding handcart.

2. Description of Related Art Including Information Disclosed Under 37 CFR 1.97 and 37 CFR 1.98

In general, a handcart is a carrying device that enables moving an article, a box, or the like by use of a wheel.

Especially, among various kinds of handcarts, a four-wheeled handcart includes: a loading plate loading an article; a loading plate wheel provided at a lower surface of the loading plate to move the cart; and a handle provided at a rear side of the loading plate to push or pull the cart, such that the handcart has a structure that facilitates moving of heavy articles by loading on the loading plate. In addition, the cart is configured such that, when the cart is not used for loading an article or box, the handle is constructed to be foldable toward the loading plate with respect to a hinge for storing the cart or for convenient transport.

However, the conventional four-wheeled handcart has a problem in that a user must carry a heavy folded four-wheeled handcart because there is no wheel for moving the cart in the folded state.

In addition, the conventional four-wheeled handcart has a problem in that it is impossible to hold a folded box or the like, which can store an article, between the loading plate and the handle while the handle is folded toward the loading plate, thereby lowering ease of use.

In addition, in the case of a conventional four-wheeled handcart in which a loading plate wheel is automatically folded, an additional device is required to secure the loading plate wheel while the loading plate is in an unfolded state.

DOCUMENTS OF RELATED ART (Patent Document 0001) Korean Utility Model Application Publication No. 20-1999-0033105, published on Aug. 5, 1999; and (Patent Document 0002) Korean Patent No. 10-1787239, published on Oct. 18, 2017.

BRIEF SUMMARY OF THE INVENTION

Accordingly, the present invention has been made keeping in mind the above problems occurring in the related art, and an objective of the present invention is to provide a four-wheeled folding handcart having stable structure and form to resist external force applied on a loading plate wheel when the handcart is unfolded, the four-wheeled folding handcart realizing a simple driving system for a wheel rod, and the four-wheeled folding handcart being capable of folding and unfolding a wheel automatically such that the cart can stably bear the weight of a loaded article in an unfolded state and ease of use can be improved.

In addition, another objective of the present invention to provide a four-wheeled folding handcart configured such that a loading plate button for folding a loading plate toward a main body is disposed on the opposite side of a hinge unit such that it is possible to fold or unfold the four-wheeled folding handcart by gripping the same portion, thereby improving ease of use.

In addition, still another objective of the present invention is to provide a four-wheeled folding handcart enabling a user to move the cart easily due to wheels of the cart and to keep the cart in an upright state while the cart is folded such that the cart is portable and easy to be stored.

Furthermore, still another objective of the present invention is to provide a four-wheeled folding handcart configured such that a handle is tilted to a user side for convenience when transporting an article loaded on a loading plate and configured such that an article such as a folding box in a folded state is loaded on a space between a main body and a loading plate while the cart is in a folded state.

In order to achieve the above object, according to one aspect of the present invention, there is provided a four-wheeled folding handcart, including: a main body; and a loading plate provided with at least one loading plate wheel unit at a lower portion thereof, connected to the main body via a hinge unit such that the loading plate is folded by the hinge unit while being rotated toward the main body, and loading an article thereon, wherein the loading plate wheel unit is connected to a wheel rod rotated by the rotation of the hinge unit in a direction perpendicular to a rotational direction of the hinge unit, the loading plate wheel unit is configured such that, when the loading plate is rotated and folded toward the main body, the loading plate wheel unit is rotated and folded toward a bottom surface of the loading plate as the wheel rod rotates, and the loading plate wheel unit is configured such that, when the loading plate is rotated and unfolded in the direction perpendicular to the main body, the loading plate wheel unit is rotated and unfolded in a direction perpendicular to the loading plate as the wheel rod rotates reversely.

The wheel rod may be provided with a vertical protrusion protruding from a portion thereof vertically and rotating the wheel rod in accordance with the rotation of the hinge unit. The main body may be provided with a guide recess having a shape in which the vertical protrusion is inserted and corresponding to a rotation path of the vertical protrusion such that the loading plate wheel unit is folded toward the bottom surface of the loading plate or unfolded in the direction perpendicular to the loading plate by rotation of the vertical protrusion.

The guide recess may be provided with a vertical protrusion supporting wall abutting a side of the vertical protrusion and supporting the vertical protrusion when the loading plate is unfolded in the direction perpendicular to the main body such that the loading plate wheel unit is prevented from being folded toward the bottom surface of the loading plate.

The wheel rod may be provided with a wheel rod arm at a portion thereof, the wheel rod arm protruding in a direction perpendicular to the wheel rod to engaging with the loading plate wheel unit in a direction perpendicular to the wheel rod arm. The wheel rod arm may be configured to come into contact with the bottom surface of the loading plate to support the loading plate wheel unit when the loading plate wheel unit is unfolded and brought into contact with the ground such that the wheel rod arm prevents the loading plate wheel unit from being folded toward the bottom surface of the loading plate due to the weight of an article loaded on the loading plate or due to an external force, or prevents the loading plate wheel unit from being unfolded in a direction opposite to the folded direction of the loading plate wheel unit.

The loading plate may be provided with a fixing bar in which a first end thereof is configured to protrude. The fixing bar may be configured such that, when the loading plate is unfolded in the direction perpendicular to the main body, the first end thereof is inserted into a first insertion recess configured in the main body to hold the loading plate and to prevent the loading plate from being folded toward the main body.

The loading plate may be provided with a loading plate button, which is disposed on the opposite side of the hinge unit and connected to the fixing bar via a fixing bar actuating unit. The loading plate button may be configured such that, when the loading plate button is pressed, the fixing bar is pulled by the fixing bar actuating unit so that the first end of the fixing bar is released from the first insertion recess such that the loading plate is folded toward the main body.

A hinge cover may be provided on a lower portion of the main body and have a second insertion recess in which the first end of the fixing bar is inserted. The hinge cover may be configured such that, when the loading plate is folded toward the main body, the first end of the fixing bar is inserted into the second insertion recess to hold the loading plate and to prevent the loading plate from being unfolded in the direction perpendicular to the main body.

The main body may be provided with at least one main body wheel unit.

The loading plate may be provided with at least one auxiliary wheel unit to move the four-wheeled folding handcart when the loading plate is folded toward the main body and the loading plate wheel unit is folded toward the bottom surface of the loading plate.

The hinge unit may be provided with an upright leg at a side thereof. The upright leg may be configured to protrude to the ground by the rotation of the hinge unit to make the four-wheeled folding handcart upright when the loading plate is folded toward the main body. The upright leg may be configured to be pulled up to a lower portion of the main body by the rotation of the hinge unit when the loading plate is unfolded in the direction perpendicular to the main body.

The main body may be provided with a supporter configured to extend vertically from a lower portion of the main body. When the loading plate is rotated and folded toward the main body, a predetermined stowing space may be provided between the main body and the loading plate and determined depending on an area of the supporter such that a folding box is folded and stowed therein.

The main body may be provided with a connecting part to hold the folding box.

The main body may be provided with a handle whose angle is adjustable with respect to the main body.

According to the present invention, a four-wheeled folding handcart is configured such that a loading plate is folded toward a main body or unfolded in the direction perpendicular to the main body by pressing a loading plate button disposed on the opposite side of a hinge unit and gripping the same portion, thereby improving ease of use.

In addition, according to the present invention, ease of use is excellent because it is possible to load a folded article storage box between the loading plate and the main body in a state where the loading plate is folded toward the main body. In addition, when the loading plate is unfolded in a direction perpendicular to the main body, it is possible to prevent the loading plate from being folded toward the main body by the weight of an article or box, thereby stably loading the article or box on the loading plate.

In addition, according to the present invention, a loading plate wheel can be folded and unfolded automatically and can be stable without an additional device securing the loading plate wheel.

In addition, according to the present invention, a user can tilt a handle to the user side if necessary. Furthermore, a user can move the cart easily due to wheels of the cart and keep the cart in an upright state while the cart is folded.

BRIEF DESCRIPTION OF THE SEVERAL VIEWS OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

In the following description, it is to be noted that, when the functions of conventional elements and the detailed description of elements related with the present invention may make the gist of the present invention unclear, a detailed description of those elements will be omitted. In addition, it will be understood that, although the terms "first", "second", etc. may be used herein to describe various elements, these elements should not be limited by these terms. These terms are only used to distinguish one element from another element.

Furthermore, all terms or words used in the description and claims have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Therefore, the description proposed herein is just a preferable example for the purpose of illustrations only, and is not intended to limit the scope of the disclosure, so it should be understood that other equivalents and modifications could be made thereto without departing from the spirit and scope of the disclosure.

Hereinbelow, embodiments of the present invention will be described in detail. However, descriptions of known functions and configurations which have been deemed to make the gist of the present invention unnecessarily obscure will be omitted below.

Figure 1:
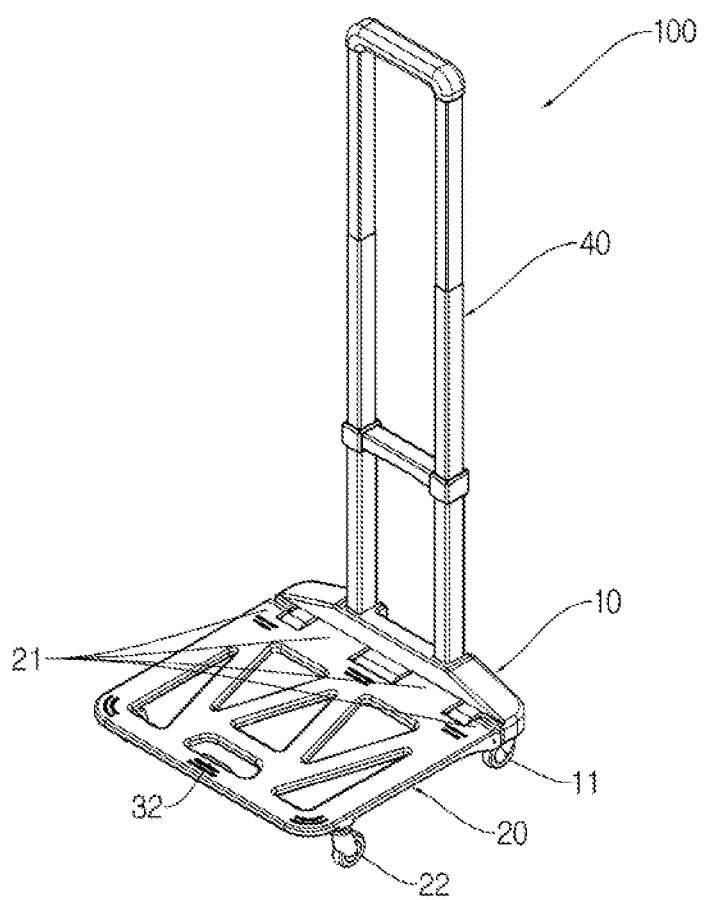
FIGS. 1 and 2 are perspective views each illustrating a four-wheeled folding handcart according to an embodiment of the present invention.
Figure 2:
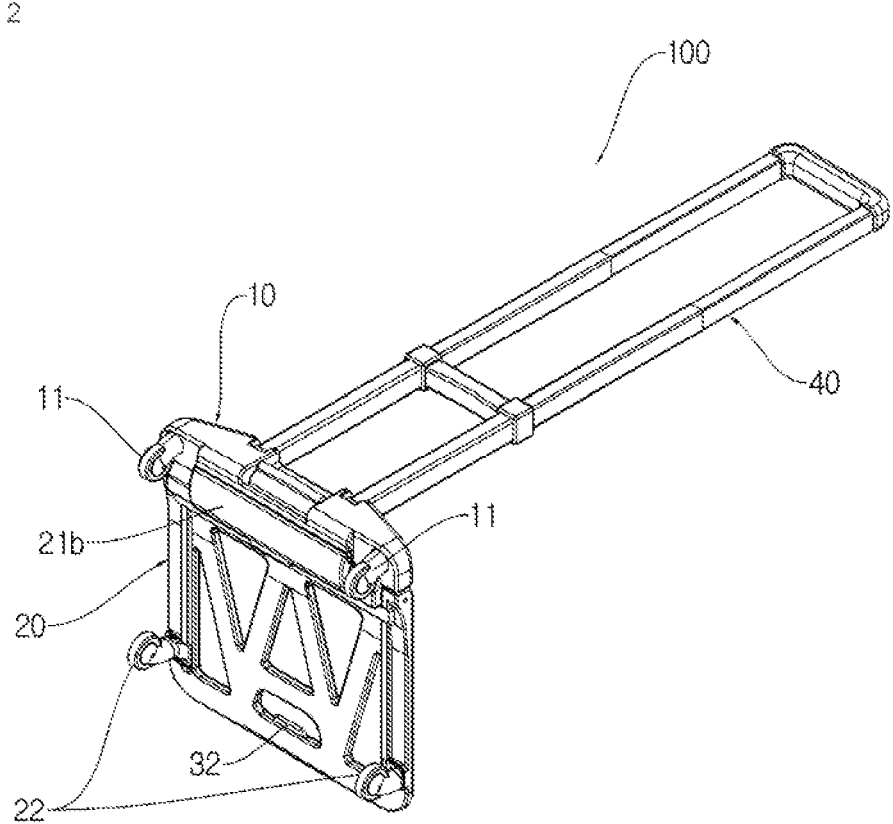
Figure 3:
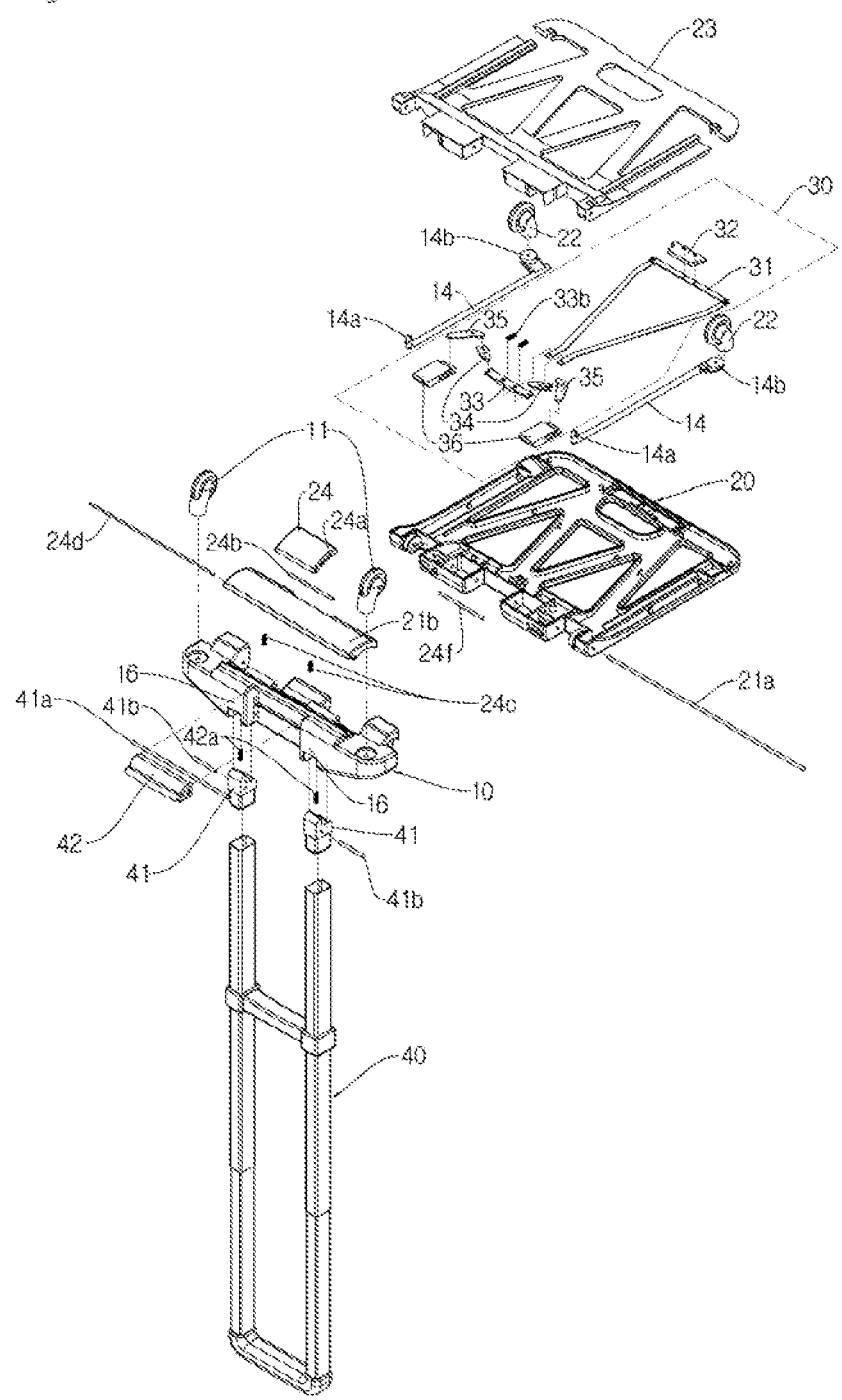
FIG. 3 is an exploded perspective view illustrating a four-wheeled folding handcart according to an embodiment of the present invention.
Figure 4:
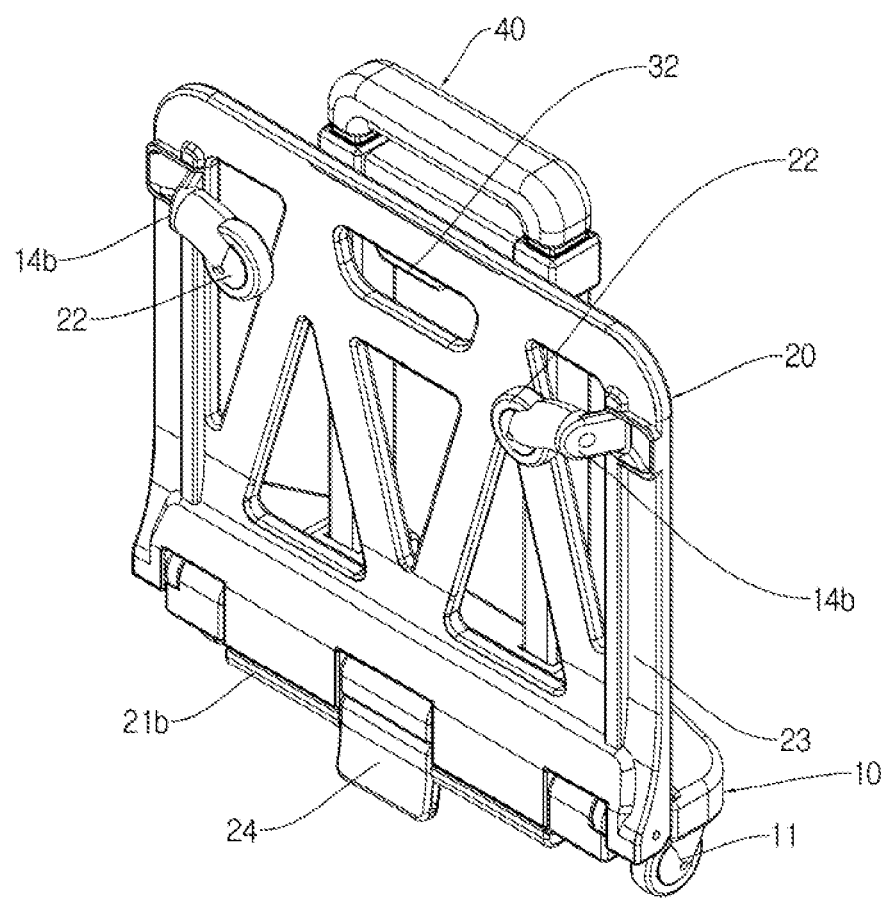
FIGS. 4 and 5 are perspective views each illustrating a four-wheeled folding handcart according to an embodiment of the present invention in a folded state.
Figure 5:
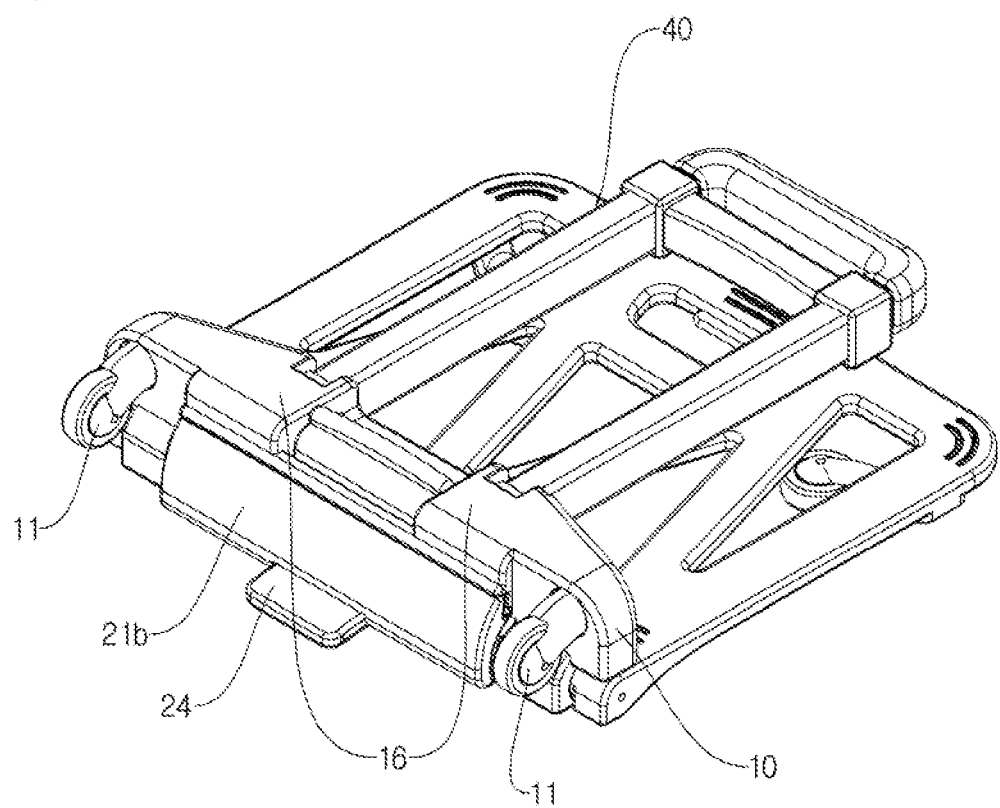
Figure 6:
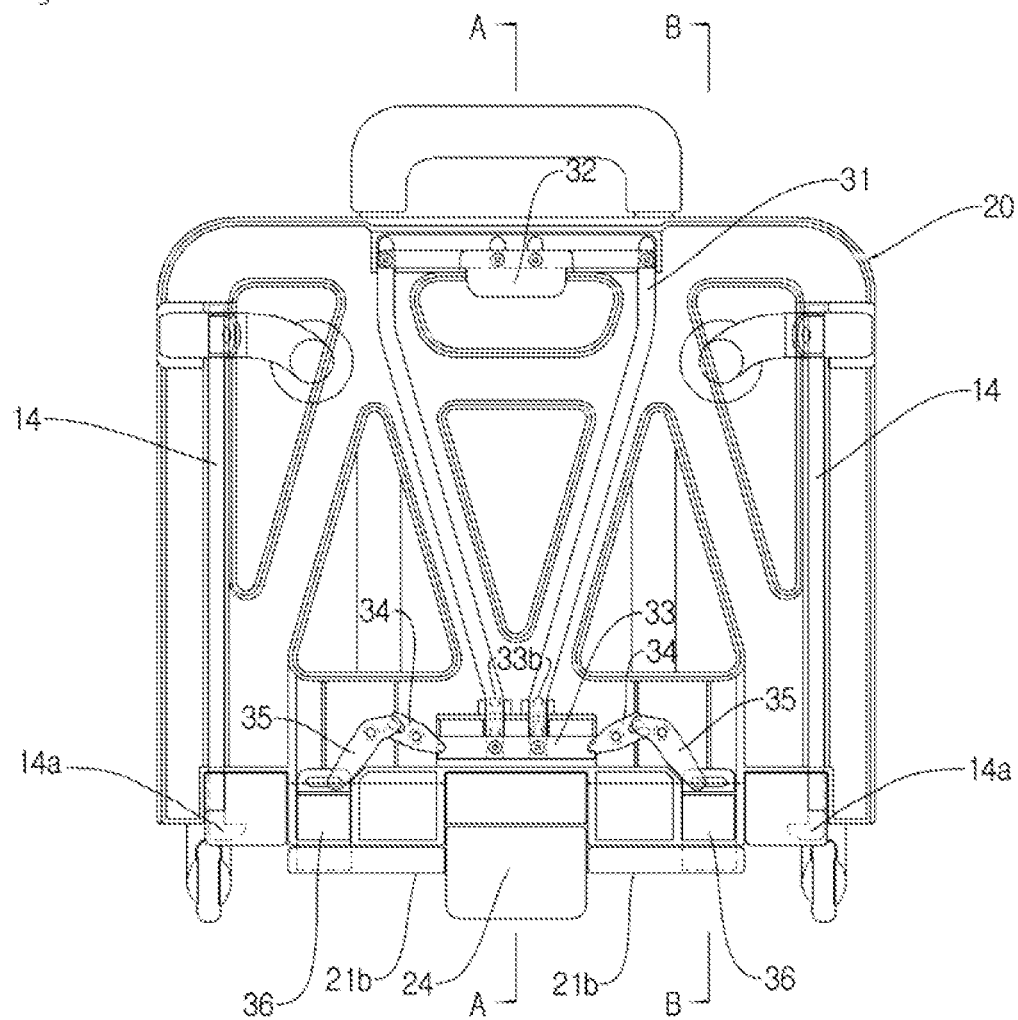
FIG. 6 is an elevational view illustrating an internal structure of a four-wheeled folding handcart according to an embodiment of the present invention when a loading plate of the four-wheeled folding handcart is folded.
Figure 7:
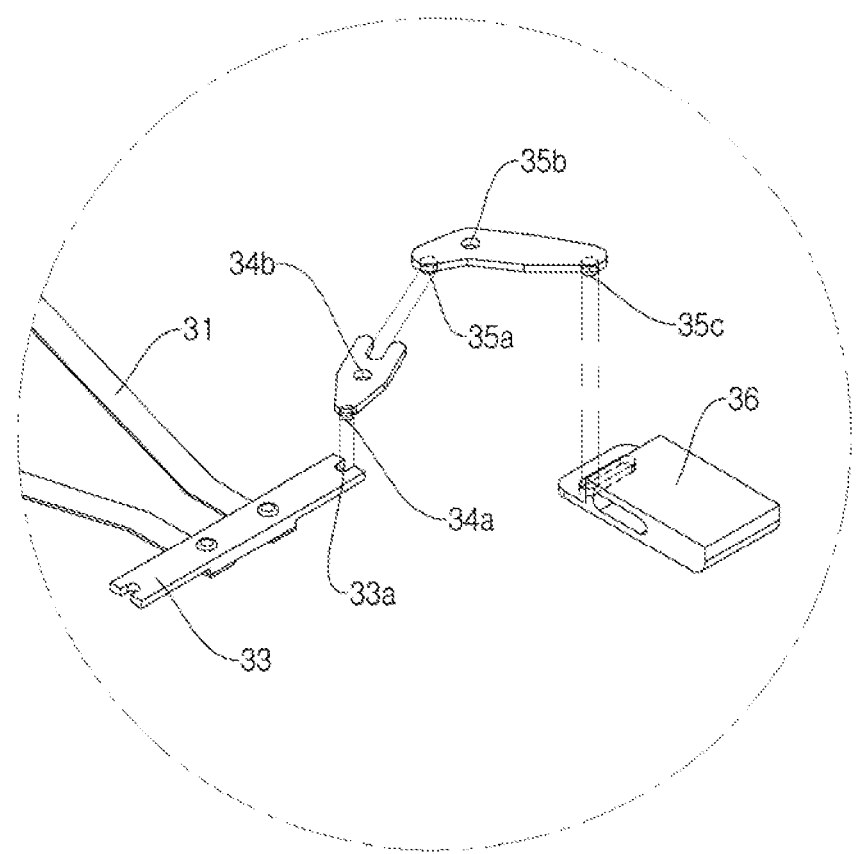
FIG. 7 is a partial perspective view illustrating a configuration of a fixing bar actuating unit in the elevational view of FIG. 6.
Figure 8:
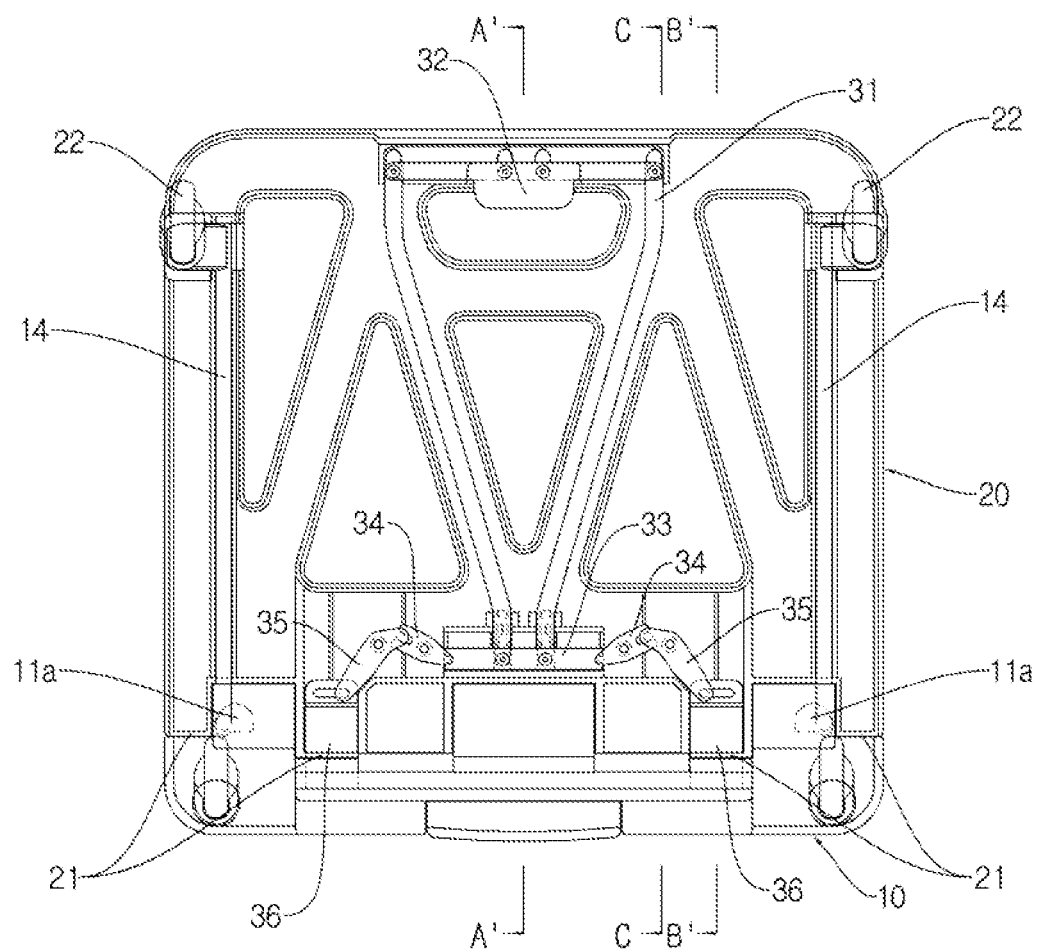
FIG. 8 is an elevational view illustrating an internal structure of a four-wheeled folding handcart according to an embodiment of the present invention when a loading plate of the four-wheeled folding handcart is unfolded.

FIGS. 1 and 2 are perspective views each illustrating a four-wheeled folding handcart according to an embodiment of the present invention; FIG. 3 is an exploded perspective view illustrating a four-wheeled folding handcart according to an embodiment of the present invention; FIGS. 4 and 5 are perspective views each illustrating a four-wheeled folding handcart according to an embodiment of the present invention in a folded state; FIG. 6 is an elevational view illustrating an internal structure of a four-wheeled folding handcart according to an embodiment of the present invention when a loading plate of the four-wheeled folding handcart is folded; FIG. 7 is a partial perspective view illustrating a configuration of a fixing bar actuating unit in the elevational view of FIG. 6; FIG. 8 is an elevational view illustrating an internal structure of a four-wheeled folding handcart according to an embodiment of the present invention when a loading plate of the four-wheeled folding handcart is unfolded.

Figure 9:
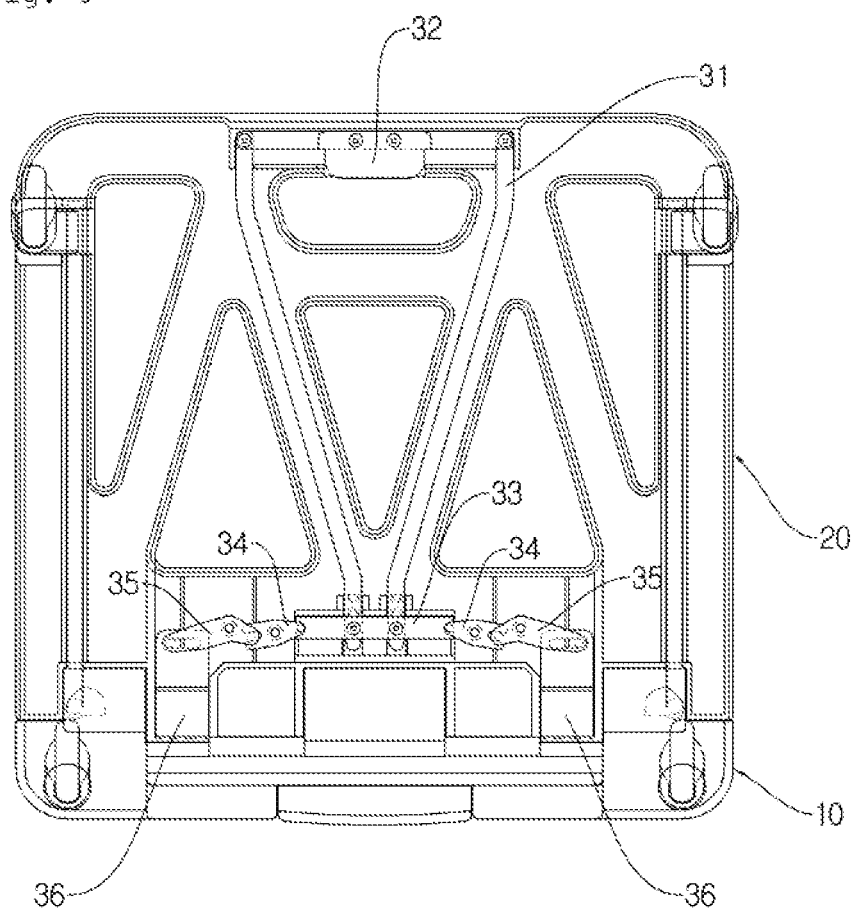
FIG. 9 is an elevational view illustrating a state of a fixing bar actuating unit when a loading plate button is pressed in FIG. 8.
Figure 10:
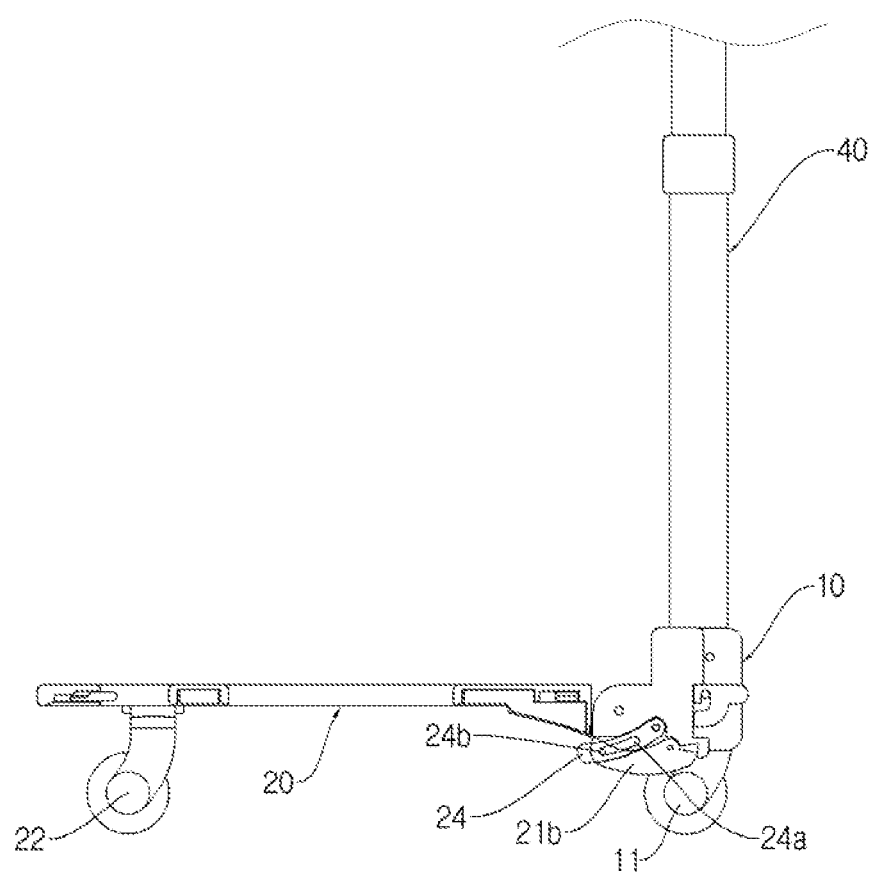
FIG. 10 is a sectional view taken along line A'-A' in FIG. 8 illustrating the loading plate of the four-wheeled folding handcart according to the present invention in an unfolded state.
Figure 11:
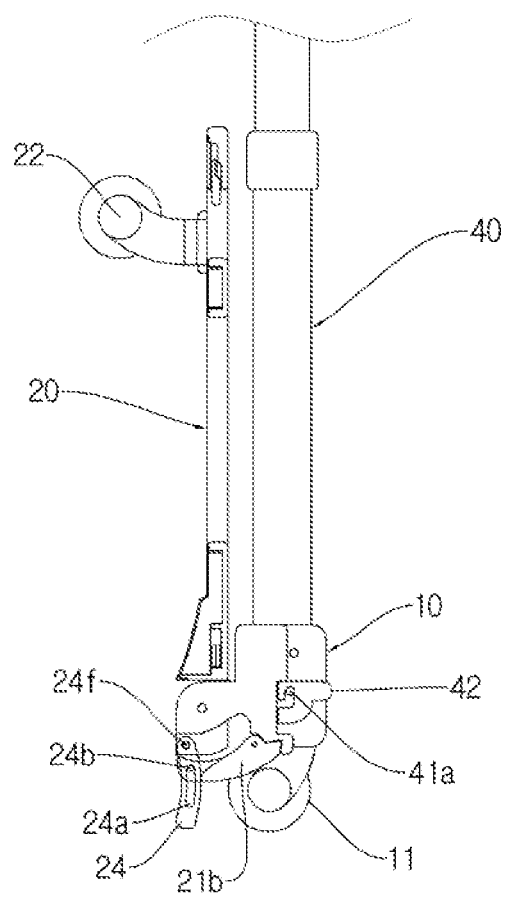
FIG. 11 is a sectional view taken along line A-A in FIG. 6 illustrating the loading plate of the four-wheeled folding handcart according to the present invention in a folded state.
Figure 12:
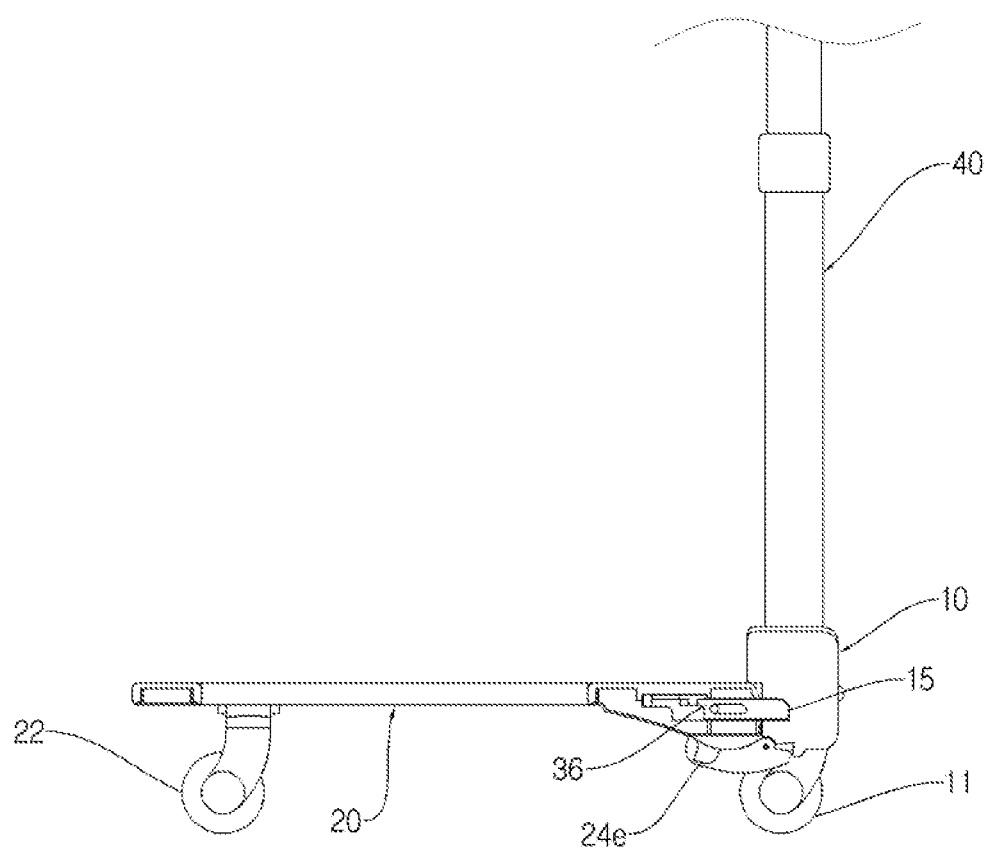
FIG. 12 is a sectional view taken along line B'-B' in FIG. 8 illustrating the loading plate of the four-wheeled folding handcart according to the present invention in an unfolded state.
Figure 13:
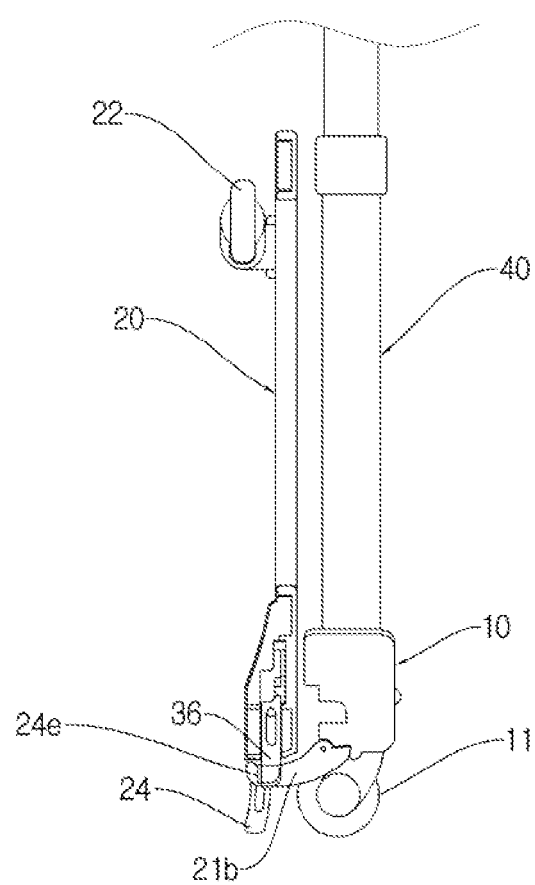
FIG. 13 is a sectional view taken along line B-B in FIG. 6 illustrating the loading plate of the four-wheeled folding handcart according to the present invention in a folded state.
Figure 14:
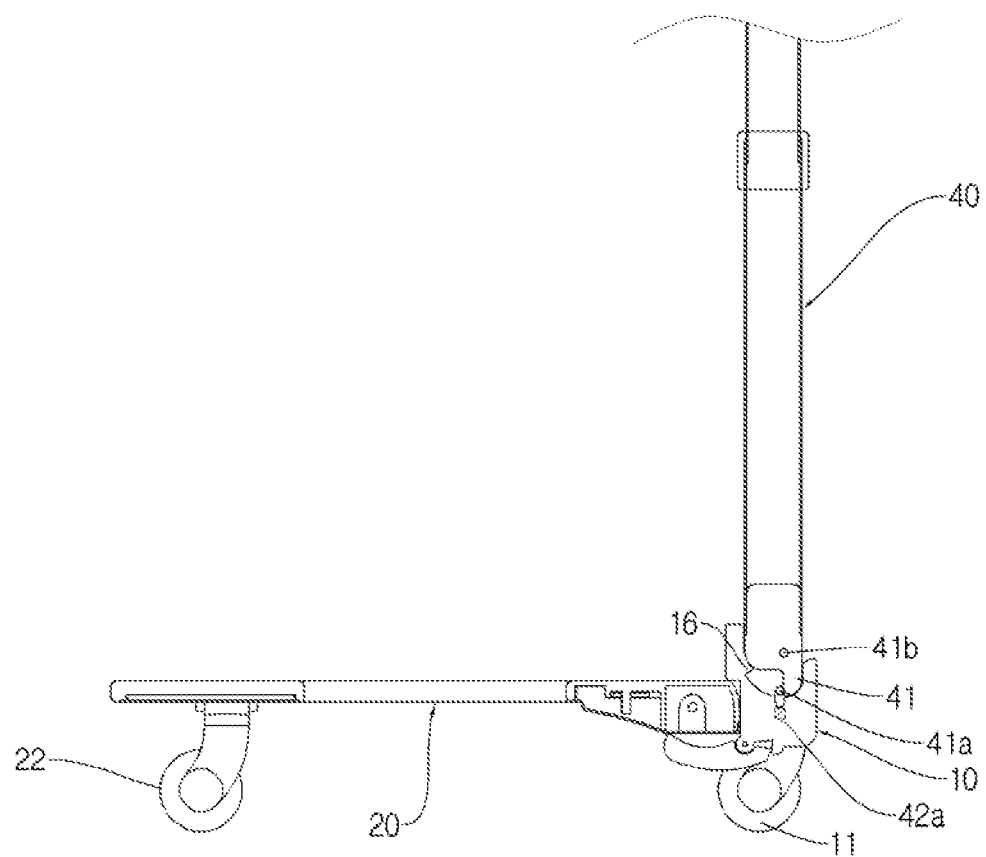
FIG. 14 is a sectional view taken along line C-C in FIG. 8 illustrating the loading plate of the four-wheeled folding handcart according to the present invention in an unfolded state.
Figure 15:
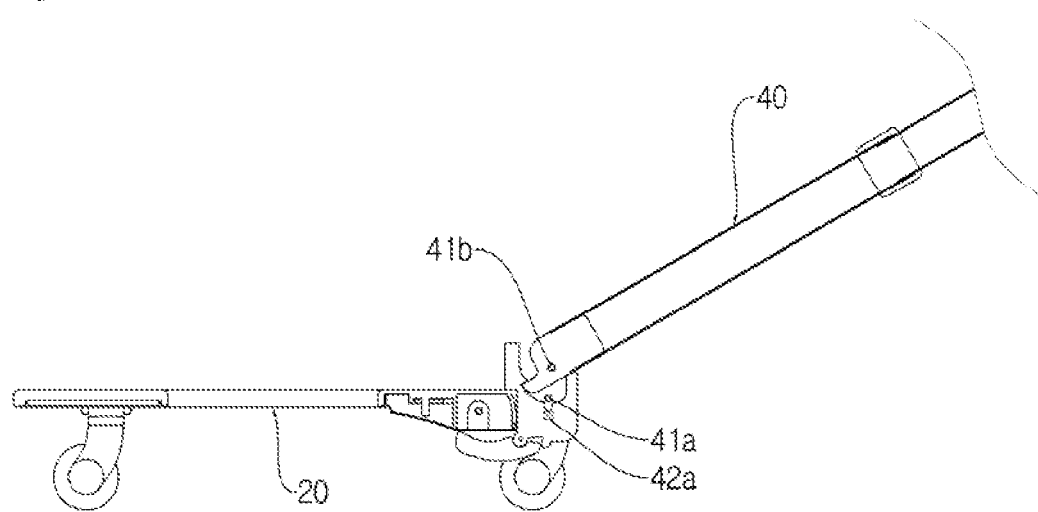
FIG. 15 is a sectional view of FIG. 14 illustrating a state in which a handle is tilted backward.
Figure 16:
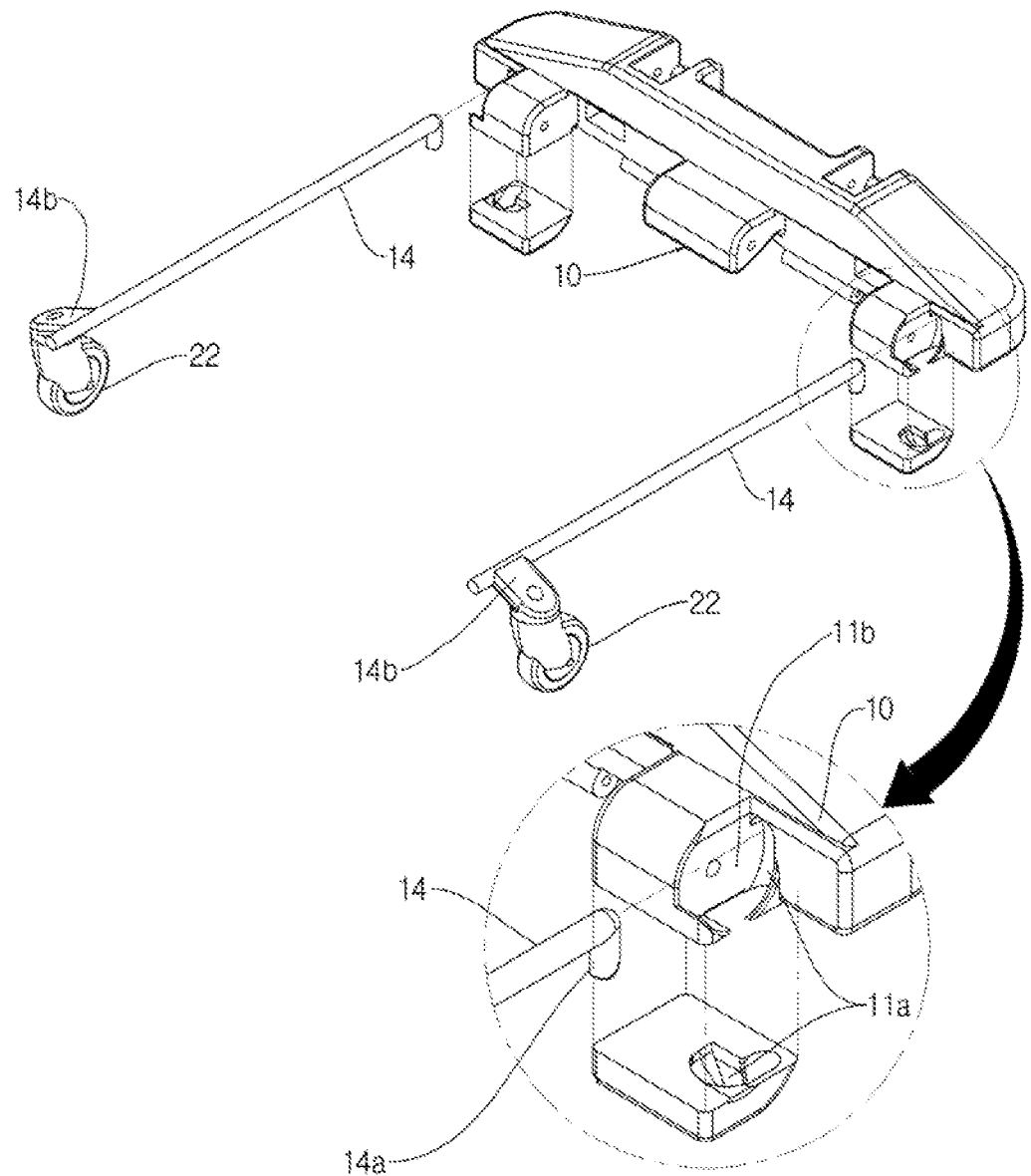
FIGS. 16 and 17 are views illustrating an operating process of a wheel rod and a loading plate wheel unit of a four-wheeled folding handcart according to an embodiment of the present invention.
Figure 17:
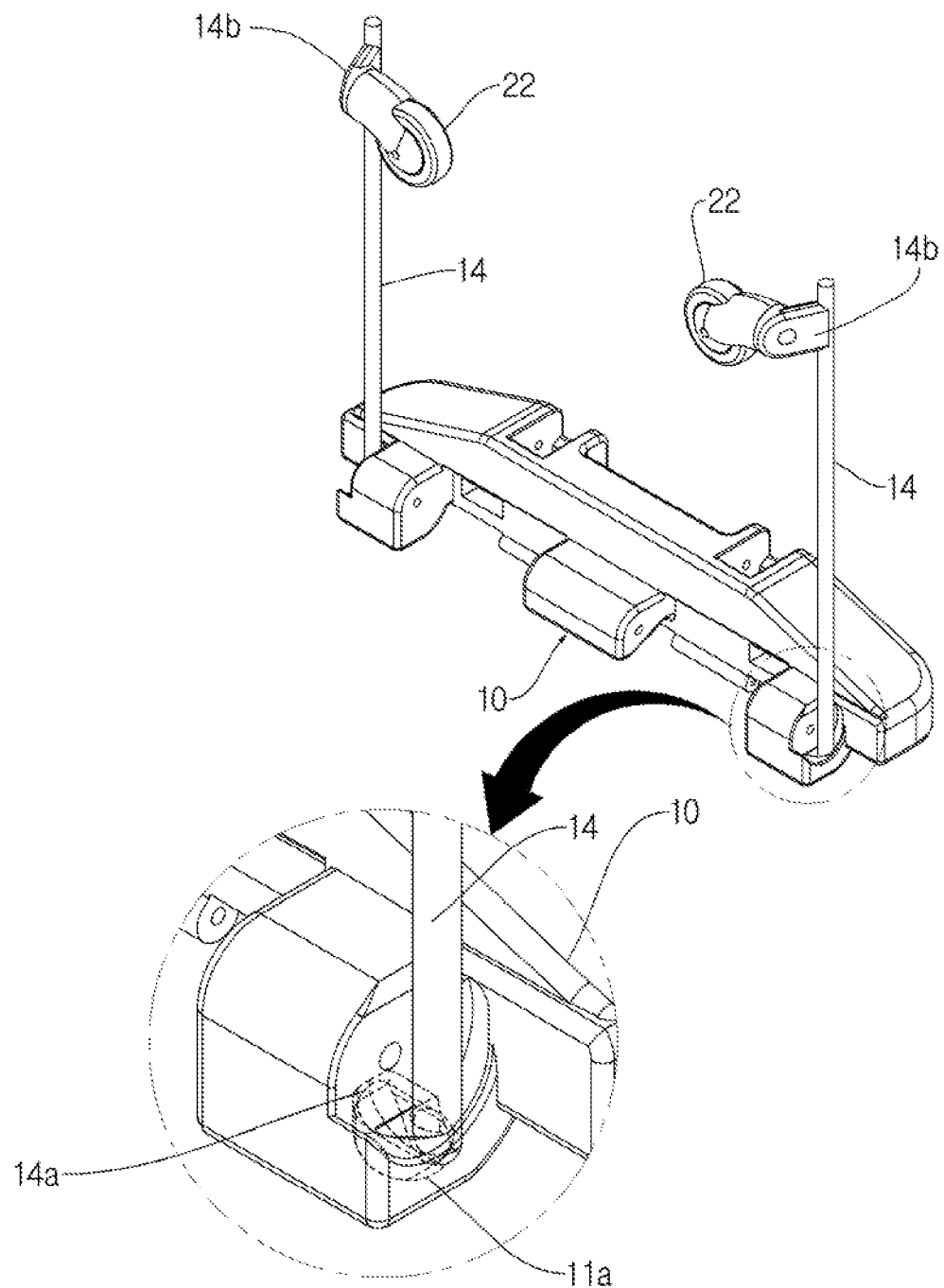

FIG. 9 is an elevational view illustrating a state of a fixing bar actuating unit when a loading plate button is pressed in FIG. 8; FIG. 10 is a sectional view taken along line A'-A' in FIG. 8 illustrating the loading plate of the four-wheeled folding handcart according to the present invention in an unfolded state; FIG. 11 is a sectional view taken along line A-A in FIG. 6 illustrating the loading plate of the four-wheeled folding handcart according to the present invention in a folded state; FIG. 12 is a sectional view taken along line B'-B' in FIG. 8 illustrating the loading plate of the four-wheeled folding handcart according to the present invention in an unfolded state; FIG. 13 is a sectional view taken along line B-B in FIG. 6 illustrating the loading plate of the four-wheeled folding handcart according to the present invention in a folded state; FIG. 14 is a sectional view taken along line C-C in FIG. 8 illustrating the loading plate of the four-wheeled folding handcart according to the present invention in an unfolded state; FIG. 15 is a sectional view of FIG. 14 illustrating a state in which a handle is tilted backward; FIGS. 16 and 17 are views illustrating an operating process of a wheel rod and a loading plate wheel unit of a four-wheeled folding handcart according to an embodiment of the present invention.

Figure 18:
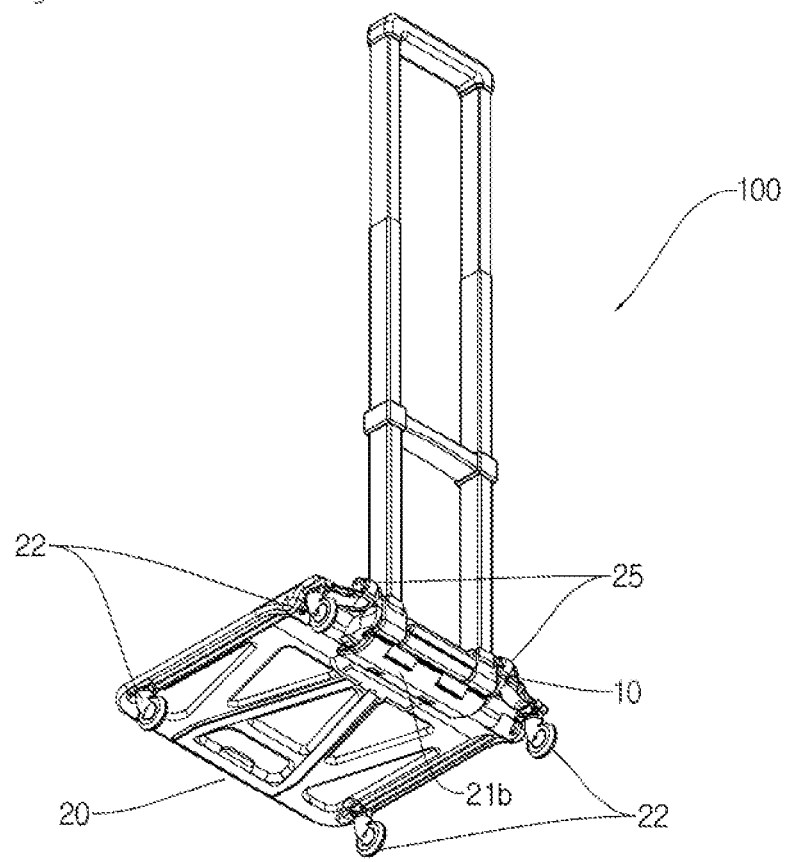
FIG. 18 is a perspective view illustrating a four-wheeled folding handcart according to another embodiment of the present invention.
Figure 19:
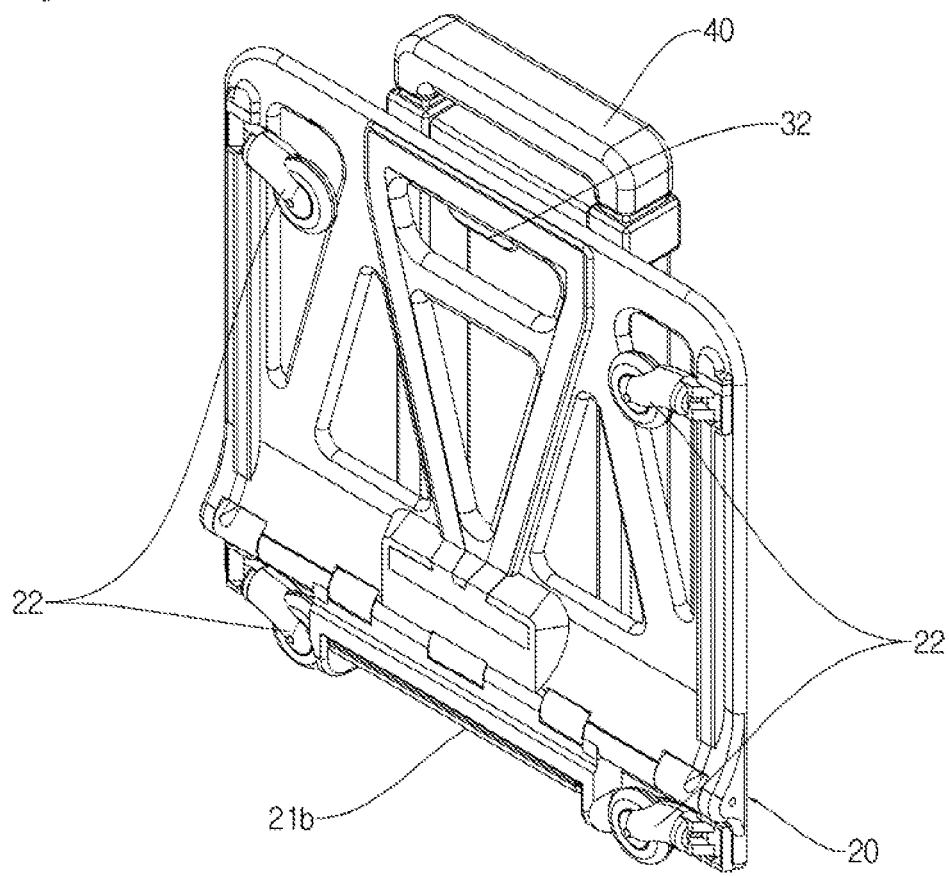
FIGS. 19 and 20 are perspective views illustrating a four-wheeled folding handcart according to another embodiment of the present invention in a folded state.
Figure 20:
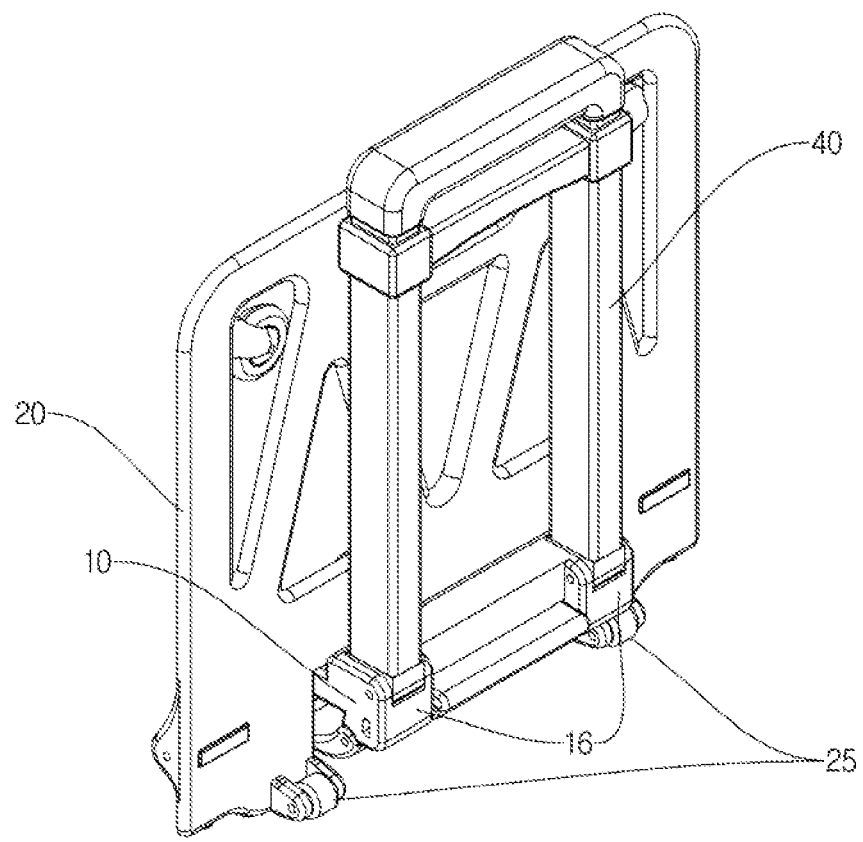
Figure 21:
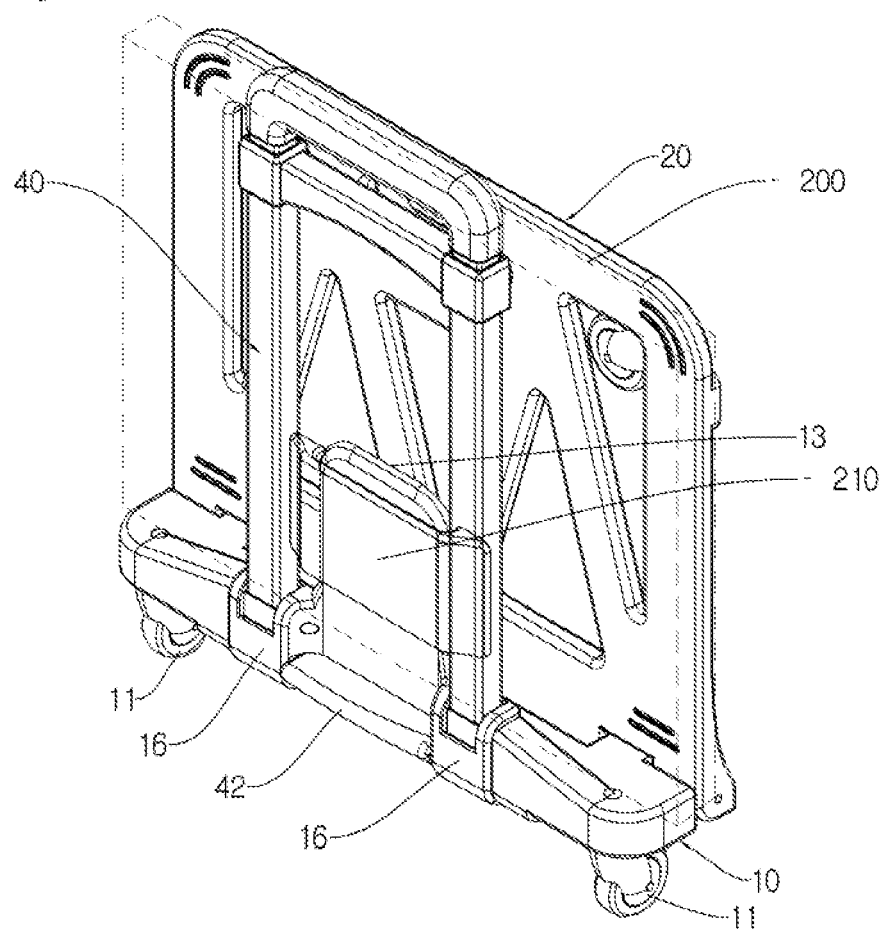
FIG. 21 is a perspective view illustrating a four-wheeled folding handcart according to still another embodiment of the present invention in a folded state.
Figure 22:
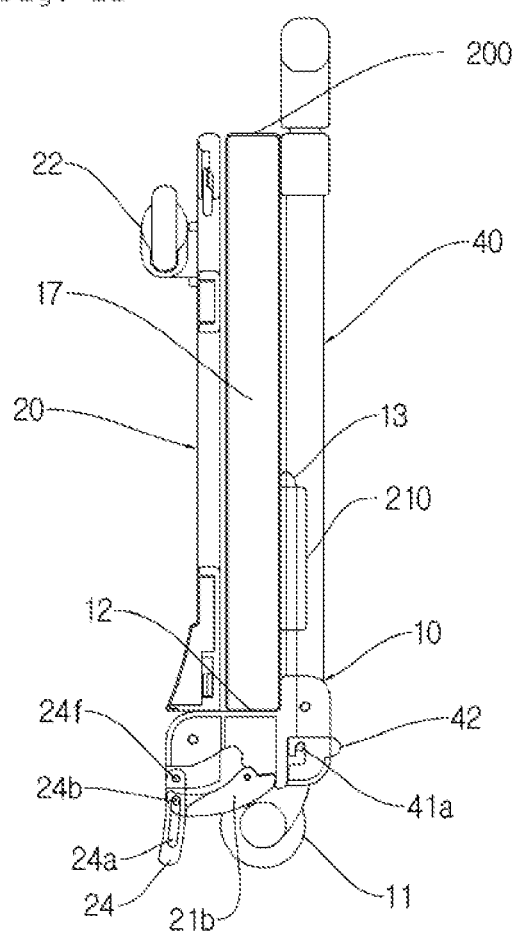
FIG. 22 is a sectional view illustrating the four-wheeled folding handcart according to still another embodiment of the present invention in a folded state.
Figure 23:
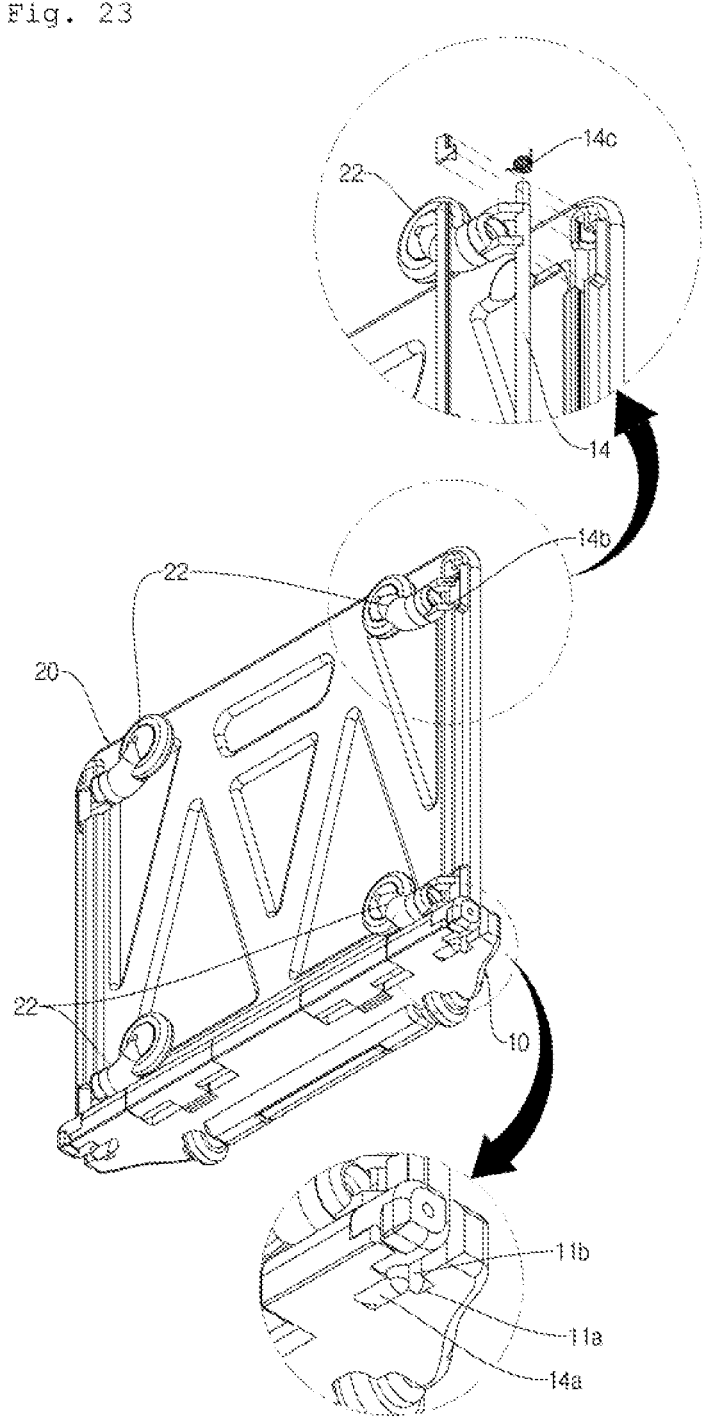
FIG. 23 illustrates an operation of a loading plate of a four-wheeled folding handcart according to a further embodiment of the present invention in a case where the loading plate is folded.
Figure 24:
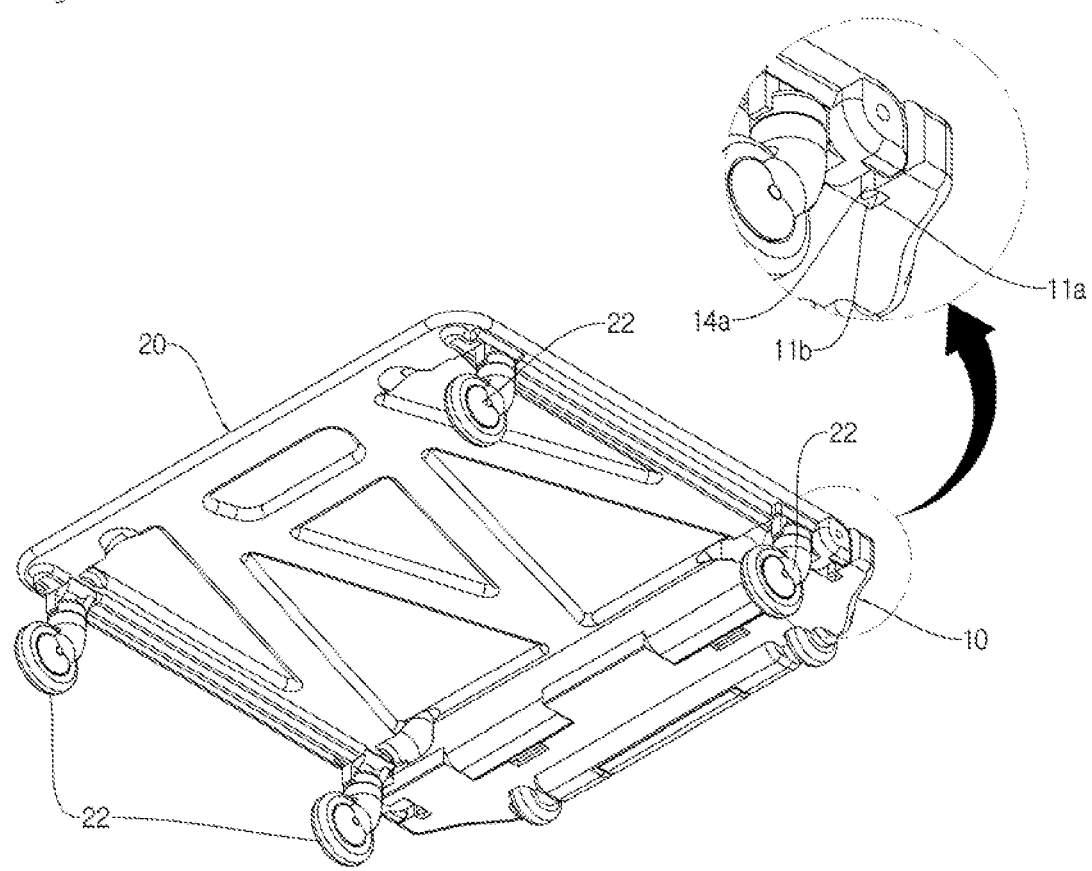
FIG. 24 illustrates an operation of a loading plate of a four-wheeled folding handcart according to a further embodiment of the present invention in a case where the loading plate is unfolded.

FIG. 18 is a perspective view illustrating a four-wheeled folding handcart according to another embodiment of the present invention; FIGS. 19 and 20 are perspective views illustrating a four-wheeled folding handcart according to another embodiment of the present invention in a folded state; FIG. 21 is a perspective view illustrating a four-wheeled folding handcart according to still another embodiment of the present invention in a folded state; FIG. 22 is a sectional view illustrating the four-wheeled folding handcart according to still another embodiment of the present invention in a folded state; FIG. 23 illustrates an operation of a loading plate of a four-wheeled folding handcart according to a further embodiment of the present invention in a case where the loading plate is folded; and FIG. 24 illustrates an operation of a loading plate of a four-wheeled folding handcart according to a further embodiment of the present invention in a case where the loading plate is unfolded.

A four-wheeled folding handcart 100 according to an embodiment of the present invention includes: a main body 10; and a loading plate 20 provided with at least one loading plate wheel unit 22 at a lower portion thereof, connected to the main body 10 via a hinge unit 21 such that the loading plate 20 is folded by the hinge unit 21 while being rotated toward the main body 10, and loading an article thereon. The loading plate wheel unit 22 is connected to a wheel rod 14 rotated by the rotation of the hinge unit 21 in a direction perpendicular to the rotational direction of the hinge unit 21. The loading plate wheel unit 22 is configured such that the loading plate wheel unit 22 is rotated and folded toward a bottom surface of the loading plate 20 according to the rotation of the wheel rod 14 when the loading plate 20 is folded while rotating toward the main body 10, or the loading plate wheel unit 22 is rotated and unfolded in the direction perpendicular to the loading plate 20 according to the rotation of the wheel rod 14 when the loading plate 20 is unfolded while rotating in the direction perpendicular to the main body 10.

The main body 10 and the loading plate 20 may be made of a hard synthetic resin or a metal to load and safely transport an article on top.

Here, the loading plate 20 is provided with at least one loading plate wheel unit 22 at the lower portion thereof and provided with the hinge unit 21. The loading plate 20 is connected to the main body 10 via the hinge unit 21. Therefore, the loading plate 20 is foldable by about 90 degrees toward the main body 10 by the hinge unit 21, and conversely, unfoldable in the perpendicular direction with respect to the main body 10.

In addition, the hinge unit 21 may be provided with a hinge rod 21a such that the loading plate 20 is folded while rotating toward the main body 10 or is unfolded in a direction perpendicular to the main body 10.

In addition, the loading plate 20 may be provided with a loading plate lid 23 covering the loading plate 20 such that it is possible to protect and not to expose components that are provided inside the loading plate 20 and will be described below.

Furthermore, when the loading plate 20 is unfolded in the direction perpendicular to the main body 10, the four-wheeled folding handcart 100 with an article loaded on the loading plate 20 can be stably moved by using the loading plate wheel unit 22.

In the four-wheeled folding handcart 100 according to the embodiment of the present invention, the main body 10 is provided with at least one main body wheel unit 11. The main body wheel unit 11 and the loading plate wheel unit 22 are brought into contact with the ground when the loading plate 20 is unfolded in the direction perpendicular to the main body 10 such that it is possible to move the four-wheeled folding handcart 100 on which an article is loaded. Conversely, only the main body wheel unit 11 is brought into contact with the ground when the loading plate 20 is folded toward the main body 10 such that it is possible to easily move the four-wheeled folding handcart 100. In addition, according to the present invention, a loading plate support portion (not illustrated) may be provided such that, when the loading plate 20 is unfolded in the direction perpendicular to the main body 10, the loading plate support portion is in contact with the ground instead of the loading plate wheel unit 22 to support the loading plate 20. Accordingly, the four-wheeled folding hand cart 100 may be provided into a two-wheeled handcart because the four-wheeled folding handcart 100 of the present invention is moved only through the main body wheel unit 11.

Referring to FIGS. 16 and 17, in the four-wheeled folding handcart 100 according to the embodiment of the present invention, the wheel rod 14 may be provided with a vertical protrusion 14a protruding from a portion thereof vertically and rotating the wheel rod 14 in accordance with the rotation of the hinge unit 21. In addition, the main body 10 may be provided with a guide recess 11a having a shape in which the vertical protrusion 14a is inserted and corresponding to a rotation path of the vertical protrusion 14a such that the loading plate wheel unit 22 is folded toward the bottom surface of the loading plate 20 or unfolded in the direction perpendicular to the loading plate 20 by the rotation of the vertical protrusion 14a.

That is, when the hinge unit 21 rotates, the guide recess 11a pushes the vertical protrusion 14a to rotate such that the wheel rod 14 connected thereto is rotated thereby.

Here, the loading plate wheel unit 22 may be mounted on a wheel rod arm 14b provided on an end of the wheel rod 14. Accordingly, as the vertical protrusion 14a rotates inside the guide recess 11a, the loading plate wheel unit 22 is rotated and folded toward the bottom surface of the loading plate 20 or rotated and unfolded in the direction perpendicular to the loading plate 20.

Referring to FIGS. 16, 17, 23, and 24, in the four-wheeled folding handcart 100 according to the embodiment of the present invention, the guide recess 11a is configured with a vertical protrusion supporting wall 11b abutting a side of the vertical protrusion 14a and supporting the vertical protrusion 14a when the loading plate 20 is unfolded in the direction perpendicular to the main body 10. Therefore, it is possible to prevent the loading plate wheel unit 22 from being folded toward the bottom surface of the loading plate 20.

Referring to FIGS. 23 and 24, in the four-wheeled folding handcart 100 according to a further embodiment of the present invention, a shape of the guide recess 11a is configured such that the vertical protrusion 14a is pushed and rotated only when the loading plate 20 is unfolded in the direction perpendicular to the main body 10, and conversely, the vertical protrusion 14a is not pushed when the loading plate 20 is folded toward the main body 10. In this case, the wheel rod 14 may be provided with a wheel rod spring 14c. Accordingly, the wheel rod 14 is rotated by elastic force of the wheel rod spring 14c such that the loading plate wheel unit 22 is folded toward the bottom surface of the loading plate 20.

According to the present invention, a manner in which the wheel rod 14 rotates according to the rotation of the hinge unit 21 may be achieved by a bevel gear structure. That is, teeth engaged with each other may be configured at a portion where the main body 10 and the wheel rod 14 are in contact with each other. Accordingly, the wheel rod 14 is rotated together with the hinge unit 21 in the perpendicular direction by the rotation of the hinge unit 21.

Referring to FIGS. 18 to 20, in the four-wheeled folding handcart 100 according to another embodiment of the present invention, at least one auxiliary wheel unit 25 may be provided on the loading plate 20 to move the four-wheeled folding handcart 100 when the loading plate 20 is folded toward the main body 10 and the loading plate wheel unit 22 is folded toward the bottom surface of the loading plate 20.

Accordingly, when the loading plate 20 is folded toward the main body 10, it is possible to move the four-wheeled folding handcart 100 easily using the auxiliary wheel unit 25 provided on the loading plate 20, thereby improving ease of use.

In the four-wheeled folding handcart 100 according to the embodiment of the present invention, the wheel rod arm 14b protruding in a direction perpendicular to the wheel rod 14 is provided on a portion of the wheel rod 14 to engage with the loading plate wheel unit 22 in a direction perpendicular to the wheel rod arm 14b. The wheel rod arm 14b is configured to come into contact with the bottom surface of the loading plate 20 to support the loading plate wheel unit 22 when the loading plate wheel unit 22 is unfolded and brought into contact with the ground. Thus, the wheel rod arm 14b prevents the loading plate wheel unit 22 from being unexpectedly folded toward the bottom surface of the loading plate 20 due to the weight of an article loaded on the loading plate 20 or due to an external force, or prevents the loading plate wheel unit 22 from being unfolded in a direction opposite to the folded direction of the loading plate wheel unit 22. Therefore, the four-wheeled folding handcart 100 of the present invention can be stably moved while an article is loaded on the loading plate 20.

In the four-wheeled folding handcart 100 according to the embodiment of the present invention, the loading plate 20 is provided with a fixing bar 36 in which a first end thereof is configured to protrude. The fixing bar 36 is configured such that, when the loading plate 20 is unfolded in the direction perpendicular to the main body 10, the first end thereof is inserted into a first insertion recess 15 formed in the main body 10 to hold the loading plate 20 and to prevent the loading plate 20 from being folded toward the main body 10.

In the four-wheeled folding handcart 100 according to the embodiment of the present invention, the loading plate 20 is provided with a loading plate button 32, which is disposed on the opposite side of the hinge unit 21 and connected to the fixing bar 36 via the fixing bar actuating unit 30. The loading plate button 32 is configured such that, when the loading plate button 32 is pressed, the fixing bar 36 is pulled toward the loading plate button 32 so that the first end of the fixing bar 36 is released from the first insertion recess 15 such that the loading plate 20 is folded toward the main body 10.

Specifically, the loading plate 20 may be provided with a fixing bar actuating unit 30. The fixing bar actuating unit 30 may include a pulling plate 31, the loading plate button 32, a pulling bar 33, a pulling bar spring 33b, a first rotating body 34, a second rotating body 35, and the fixing bar 36. The above components may be configured to be interlocked with each other such that pressing force is transferred to the fixing bar 36 when the loading plate button 32 is pressed.

In the four-wheeled folding handcart 100 according to the embodiment of the present invention, a hinge cover 21b is provided on the lower portion of the main body 10 and has a second insertion recess 24e in which the first end of the fixing bar 36 is inserted. The hinge cover 21b is configured such that the first end of the fixing bar 36 is inserted into the second insertion recess 24e to hold the loading plate 20 and to prevent the loading plate 20 from being unfolded in the direction perpendicular to the main body 10 when the loading plate 20 is folded toward the main body 10.

Here, the hinge cover 21b is connected to the main body 10 by a hinge cover hinge rod 24d, and a hinge cover spring 24c is provided between a side of the hinge cover 21b and the lower portion of the main body 10. Accordingly, the hinge cover 21b is configured such that the hinge cover 21b is pushed up by the hinge cover spring 24c when the loading plate 20 is unfolded in the direction perpendicular to the main body 10 and the four-wheeled folding handcart 100 is moved.

In the four-wheeled folding handcart 100 according to the embodiment of the present invention, an upright leg 24 is provided on a side of the hinge unit 21. The upright leg 24 is configured such that the upright leg 24 protrudes by the rotation of the hinge unit 21 to make the four-wheeled folding handcart 100 upright when the loading plate 20 is folded toward the main body 10, and the upright leg 24 is pulled up to the lower portion of the main body 10 by the rotation of the hinge unit 21 when the loading plate 20 is unfolded in the direction perpendicular to the main body 10.

Here, the upright leg 24 may be connected to the hinge unit 21 through a leg hinge rod 24f and may be connected to the hinge cover 21b through a leg guide rod 24b.

In the four-wheeled folding handcart 100 according to the embodiment of the present invention, the main body 10 may be provided with a handle 40 whose angle is adjustable with respect to the main body 10.

In the four-wheeled folding handcart 100 according to still another embodiment of the present invention, the main body 10 is provided with a supporter 12 configured to extend vertically from the lower portion of the main body 10. When the loading plate 20 is folded while being rotated toward the main body 10, a predetermined stowing space 17 is provided between the main body 10 and the loading plate 20 and determined depending on an area of the supporter 12 such that a folding box 200 is folded and stowed therein.

Here, the folding box 200 may have a space where items are stored and may be configured to be folded inward.

In the four-wheeled folding handcart 100 according to still another embodiment of the present invention, the main body 10 is provided with a connecting part 13 to hold the folding box 200. Thus, it is preferable that the folding box 200 is provided with a connection holder 210 to be fastened to the connecting part 13.

That is, it is possible to hold the folding box 200 on the four-wheeled folding handcart 100 of the present invention through the engagement of the connection holder 210 and the connecting part 13 provided on the folding box 200. Accordingly, even when the loading plate 20 is folded toward the main body 10, the folding box 200 folded inward is stably disposed in the stowing space 17 defined between the main body 10 and the loading plate 20.

In addition, in order to improve the convenience of use, the handle 40 may be configured into a length adjustable form according to the present invention.

Hereinafter, in a case where the loading plate 20 is folded toward the main body 10 according to the embodiment of the present invention, an operation of unfolding the loading plate 20 in the direction perpendicular to the main body 10 will be described in detail.

Referring to FIGS. 6, 11, and 13, in the case where the loading plate 20 is folded toward the main body 10, the four-wheeled folding handcart 100 can be erected by the upright leg 24 or be moved by the main body wheel unit 11 in a state in which the four-wheeled folding handcart 100 is tilted backward. In addition, the loading plate wheel unit 22 is folded on the bottom surface of the loading plate 20, and the handle 40 is erected in a direction perpendicular to the ground.

Here, the upright leg 24 is connected to the hinge unit 21 through the leg hinge rod 24f and is connected to the hinge cover 21b by the leg guide rod 24b which is connected therewith by passing through a leg hole 24a such that the upright leg 24 is erected in a direction perpendicular to the ground. In addition, the fixing bar 36 is inserted into the second insertion recess 24e such that the loading plate 20 is held thereby. Referring to FIGS. 6 to 9, when pushing the loading plate button 32, the pulling plate 31 and the pulling bar 33 are raised such that a hooking dent 33a configured at opposite ends of the pulling bar 33 raises a first projection 34a configured on the first rotating body 34. As the first rotating body 34 rotates about a first central part 34b and lowers a second protrusion 35a configured in the second rotating body 35, the second rotating body 35 rotates about a second central part 35b and a third protrusion 35c pulls up the fixing bar 36 such that the fixing bar 36 is pulled out of the second insertion recess 24e whereby the loading plate 20 can be rotated. Here, when the loading plate 20 is unfolded, force that the vertical protrusion 14a contacts the inner wall of the guide recess 11a rotates the wheel rod 14 in a direction perpendicular to the rotational direction of the hinge rod 21a such that the loading plate wheel unit 22 vertically connected to the wheel rod 14 can be unfolded toward the ground.

In the case where the loading plate 20 is entirely unfolded in the direction perpendicular to the main body 10, the wheel rod arm 14b is brought into contact with the bottom surface of the loading plate 20 such that the loading plate wheel unit 22 is stably supported thereby against an external force. In addition, a side surface of the vertical protrusion 14a is brought into contact with the vertical protrusion supporting wall 11b such that the loading plate wheel unit 22 is held so as not to be folded. In addition, as illustrated in FIG. 12, the fixing bar 36 is inserted into the first insertion recess 15 by the pulling bar spring 33b. As a result, the hinge unit 21 can be held without being hung down by the weight of the article loaded on the loading plate 20. Therefore, the article can be easily loaded on the loading plate 20 unfolded in the direction perpendicular to the main body 10, and the weight of the article can be stably sustained by the unfolded main body wheel unit 11 and the loading plate wheel unit 22.

The four-wheeled folding handcart 100 according to the embodiment of the present invention can be kept in the upright state on the ground by the upright leg 24 while the loading plate 20 is folded toward the main body 10.

In addition, when rotating the loading plate 20 around the hinge rod 21a to unfold the loading plate 20, the upright leg 24 connected to the leg hinge rod 24f may be inserted into the lower end of the main body 10 in accordance with the rotation of the hinge unit 21. Here, the upright leg 24 may be supported and lifted by the leg guide rod 24b connected therewith by passing through the leg hole 24a.

Referring to FIGS. 18 to 20, the four-wheeled folding handcart 100 according to another embodiment of the present invention may be configured such that the article loaded on the four-wheeled folding handcart 100 is movable only by the loading plate wheel unit 22 without being provided with the main body wheel unit 11 when the loading plate 20 is unfolded in the direction perpendicular to the main body 10. Here, the loading plate wheel unit 22 may be provided on opposite sides of the wheel rod 14. Loading plate wheels 20 are configured to be foldable or unfoldable together by the vertical protrusion 14a and the guide recess 11a when the loading plate 20 is folded toward the main body 10 or unfolded in the direction perpendicular to the main body. In this case, the auxiliary wheel unit 25 is provided on the loading plate 20 such that the four-wheeled folding handcart 100 is easily movable thereby when the loading plate 20 is folded toward the main body 10.

Hereinafter, operating the handle 40 according to the embodiment of the present invention will be described in detail.

Specifically, the handle 40 may include a handle lever 41, a lever support rod 41a, a lever fixing rod 41b, a lever foot button 42, and a foot button spring 42a.

The handle 40 may be connected to the main body 10 and may be configured to be tilted backward against the main body 10 or held upright with the main body 10 according to needs of a user.

Referring to FIGS. 14 and 15, when pressing the lever foot button 42, the foot button spring 42a supporting the lever support rod 41a is pressed down and the lever support rod 41a is lowered. Accordingly, the handle lever 41 can be rotated in a lever mounting portion 16 provided on the main body 10 such that a user can tilt the handle 40 backward against the main body 10 to use the cart.

Conversely, when standing the handle 40 upright with respect to the main body 10, the handle lever 41 presses the lever support rod 41a and the foot button spring 42a such that the handle lever 41 is returned to the original state. Accordingly, the support rod 41a is raised by the elastic force of the foot button spring 42a and thus the handle 40 standing upright in the direction perpendicular to the ground is held.

As described above, an angle of the handle 40 of the four-wheeled folding handcart 100 according to the embodiment of the present invention is easily adjusted with respect to the main body 10 whereby convenience in use is further improved, which means that a user can move the four-wheeled folding handcart 100 easily.

Although the invention is described with reference to specific items such as specific structural elements, to merely some embodiments, and to drawings, such specific details disclosed herein are merely representative for purposes of helping more comprehensive understanding of the present invention. The present invention, however, is not limited to only the example embodiments set forth herein, and those skilled in the art will appreciate that the present invention can be embodied in many alternate forms. Accordingly, the present invention is intended to cover not only the exemplary embodiments, but also various alternatives, modifications, equivalents and other embodiments that may be included within the spirit and scope of the present invention as defined by the appended claims.

We claim:

1. A four-wheeled folding handcart, comprising:
a main body; and
a loading plate for loading an article thereon, said loading plate provided with at least one loading plate wheel unit at a lower portion thereof, connected to the main body via a hinge unit such that the loading plate is folded by the hinge unit while being rotated toward the main body,
wherein the loading plate wheel unit is connected to a wheel rod rotated by the rotation of the hinge unit in a direction perpendicular to a rotational direction of the hinge unit,
the loading plate wheel unit is configured such that, when the loading plate is rotated and folded toward the main body, the loading plate wheel unit is rotated and folded toward a bottom surface of the loading plate as the wheel rod rotates, and
the loading plate wheel unit is configured such that, when the loading plate is rotated and unfolded in the direction perpendicular to the main body, the loading plate wheel unit is rotated and unfolded in a direction perpendicular to the loading plate as the wheel rod rotates reversely.

2. A four-wheeled folding handcart, comprising:
a main body; and
a loading plate for loading an article thereon, said loading plate provided with at least one loading plate wheel unit at a lower portion thereof, connected to the main body via a hinge unit such that the loading plate is folded by the hinge unit while being rotated toward the main body,
wherein the loading plate wheel unit is connected to a wheel rod rotated by the rotation of the hinge unit in a direction perpendicular to a rotational direction of the hinge unit,
the loading plate wheel unit is configured such that, when the loading plate is rotated and folded toward the main body, the loading plate wheel unit is rotated and folded toward a bottom surface of the loading plate as the wheel rod rotates, and the loading plate wheel unit is configured such that, when the loading plate is rotated and unfolded in the direction perpendicular to the main body, the loading plate wheel unit is rotated and unfolded in a direction perpendicular to the loading plate as the wheel rod rotates reversely, and wherein the wheel rod is provided with a vertical protrusion protruding from a portion thereof vertically and rotating the wheel rod in accordance with the rotation of the hinge unit, and the main body is provided with a guide recess having a shape in which the vertical protrusion is inserted and corresponding to a rotation path of the vertical protrusion such that the loading plate wheel unit is folded toward the bottom surface of the loading plate or unfolded in the direction perpendicular to the loading plate by rotation of the vertical protrusion.

3. The four-wheeled folding handcart of claim 2, wherein the guide recess is provided with a vertical protrusion supporting wall abutting a side of the vertical protrusion and supporting the vertical protrusion when the loading plate is unfolded in the direction perpendicular to the main body such that the loading plate wheel unit is prevented from being folded toward the bottom surface of the loading plate.

4. The four-wheeled folding handcart of claim 1, wherein the wheel rod is provided with a wheel rod arm at a portion thereof, the wheel rod arm protruding in a direction perpendicular to the wheel rod to engaging with the loading plate wheel unit in a direction perpendicular to the wheel rod arm, and the wheel rod arm is configured to come into contact with the bottom surface of the loading plate to support the loading plate wheel unit when the loading plate wheel unit is unfolded and brought into contact with the ground such that the wheel rod arm prevents the loading plate wheel unit from being folded toward the bottom surface of the loading plate due to the weight of an article loaded on the loading plate or due to external force, or prevents the loading plate wheel unit from being unfolded in a direction opposite to the folded direction of the loading plate wheel unit.

5. The four-wheeled folding handcart of claim 1, wherein the loading plate is provided with a fixing bar in which a first end thereof is configured to protrude, and the fixing bar is configured such that, when the loading plate is unfolded in the direction perpendicular to the main body, the first end thereof is inserted into a first insertion recess configured in the main body to hold the loading plate and to prevent the loading plate from being folded toward the main body.

6. The four-wheeled folding handcart of claim 5, wherein the loading plate is provided with a loading plate button, which is disposed on the opposite side of the hinge unit and connected to the fixing bar via a fixing bar actuating unit, and the loading plate button is configured such that, when the loading plate button is pressed, the fixing bar is pulled by the fixing bar actuating unit so that the first end of the fixing bar is released from the first insertion recess such that the loading plate is folded toward the main body.

7. The four-wheeled folding handcart of claim 5, wherein a hinge cover is provided on a lower portion of the main body and has a second insertion recess in which the first end of the fixing bar is inserted, and the hinge cover is configured such that, when the loading plate is folded toward the main body, the first end of the fixing bar is inserted into the second insertion recess to hold the loading plate and to prevent the loading plate from being unfolded in the direction perpendicular to the main body.

8. The four-wheeled folding handcart of claim 1, wherein the main body is provided with at least one main body wheel unit.

9. The four-wheeled folding handcart of claim 1, wherein the loading plate is provided with at least one auxiliary wheel unit to move the four-wheeled folding handcart when the loading plate is folded toward the main body and the loading plate wheel unit is folded toward the bottom surface of the loading plate.

10. The four-wheeled folding handcart of claim 1, wherein the hinge unit is provided with an upright leg at a side thereof, the upright leg is configured to protrude to the ground by the rotation of the hinge unit to make the four-wheeled folding handcart upright when the loading plate is folded toward the main body, and the upright leg is configured to be pulled up to a lower portion of the main body by the rotation of the hinge unit when the loading plate is unfolded in the direction perpendicular to the main body.

11. A four-wheeled folding handcart, comprising:

a main body; and a loading plate for loading an article thereon, said loading plate provided with at least one loading plate wheel unit at a lower portion thereof, connected to the main body via a hinge unit such that the loading plate is folded by the hinge unit while being rotated toward the main body, wherein the loading plate wheel unit is connected to a wheel rod rotated by the rotation of the hinge unit in a direction perpendicular to a rotational direction of the hinge unit, the loading plate wheel unit is configured such that, when the loading plate is rotated and folded toward the main body, the loading plate wheel unit is rotated and folded toward a bottom surface of the loading plate as the wheel rod rotates, the loading plate wheel unit is configured such that, when the loading plate is rotated and unfolded in the direction perpendicular to the main body, the loading plate wheel unit is rotated and unfolded in a direction perpendicular to the loading plate as the wheel rod rotates reversely, the wheel rod is provided with a vertical protrusion protruding from a portion thereof vertically and rotating the wheel rod in accordance with the rotation of the hinge unit, the main body is provided with a guide recess having a shape in which the vertical protrusion is inserted such that the loading plate wheel unit is unfolded in the direction perpendicular to the loading plate by rotation of the vertical protrusion, and the wheel rod is provided with a wheel rod spring such that the loading plate wheel unit is folded toward the bottom surface of the loading plate as the wheel rod is rotated by an elastic force of the wheel rod spring.

* * * * *